Oct. 25, 1932.  A. V. T. DAY  1,885,009
METHOD AND MEANS FOR ELECTRICAL SIGNALING AND CONTROL
Filed Jan. 25, 1919   10 Sheets-Sheet 1
Fig. 1.
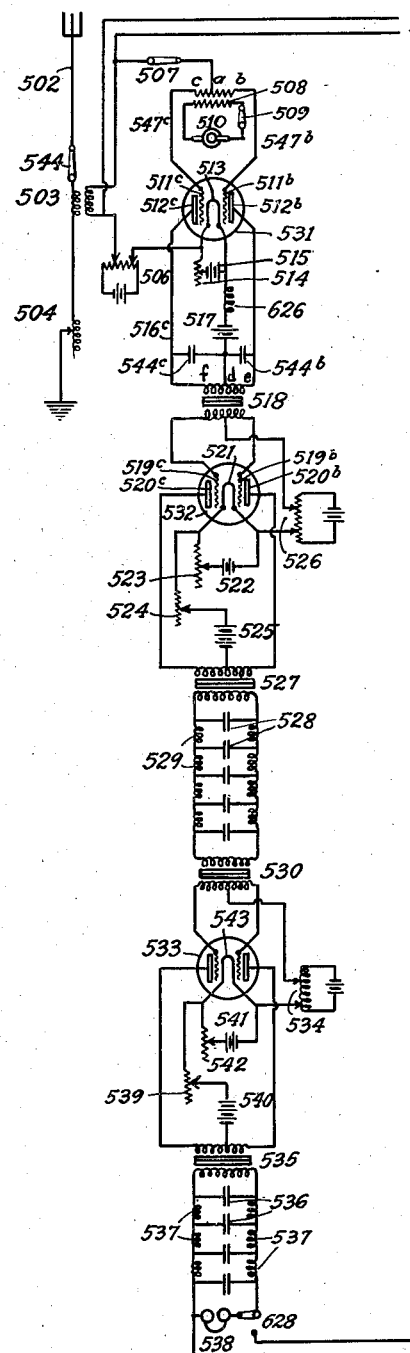
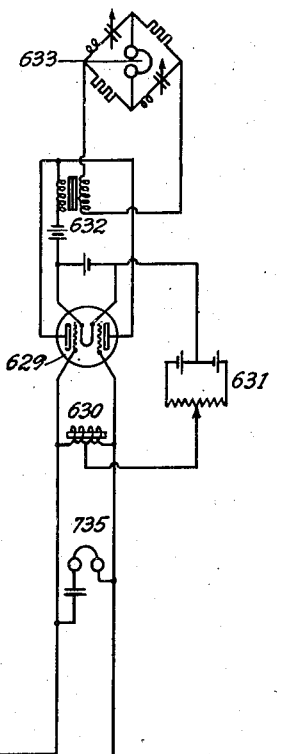
Inventor
Albert V. T. Day
By his Attorneys
Williams & Pritchard

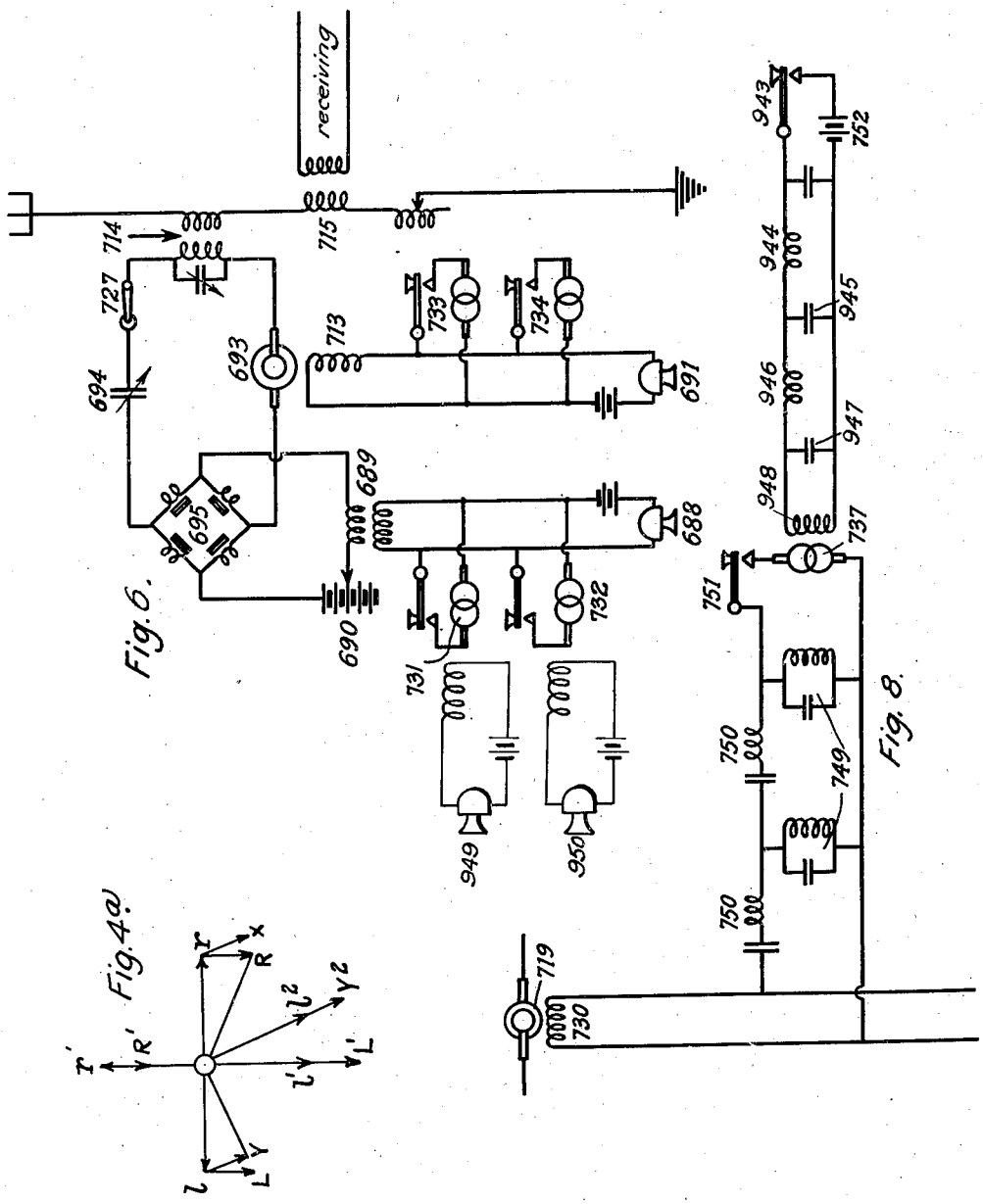

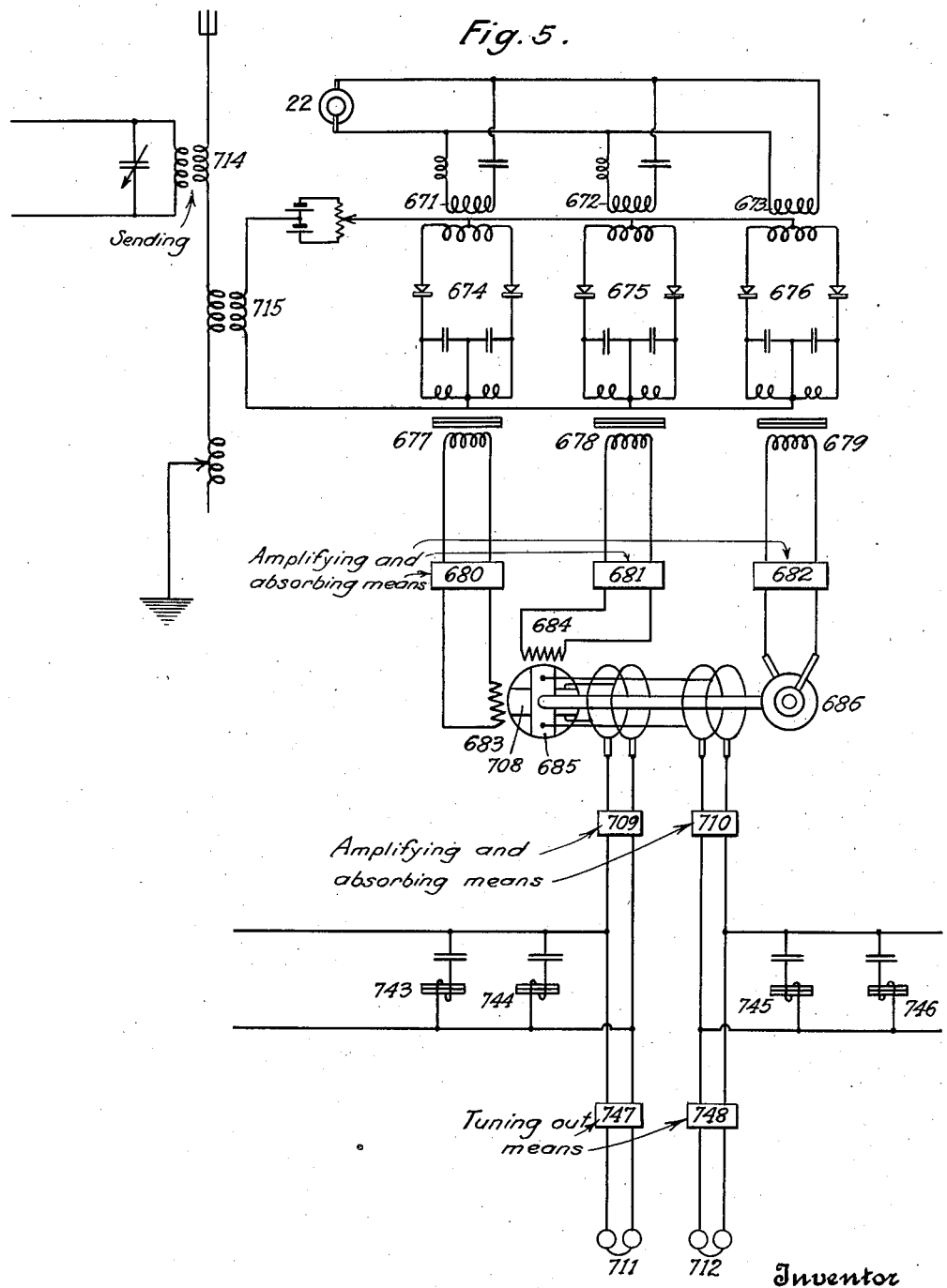

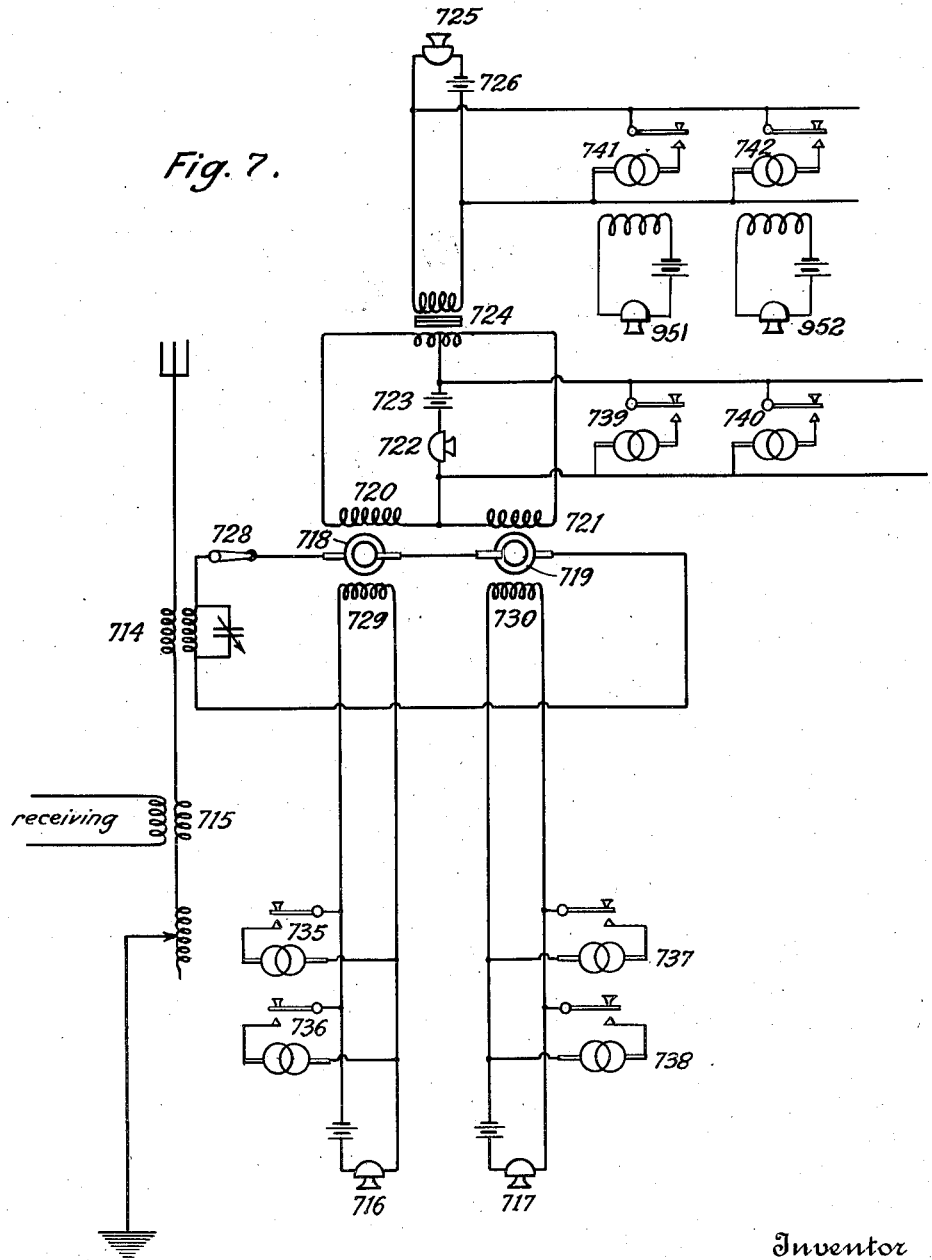

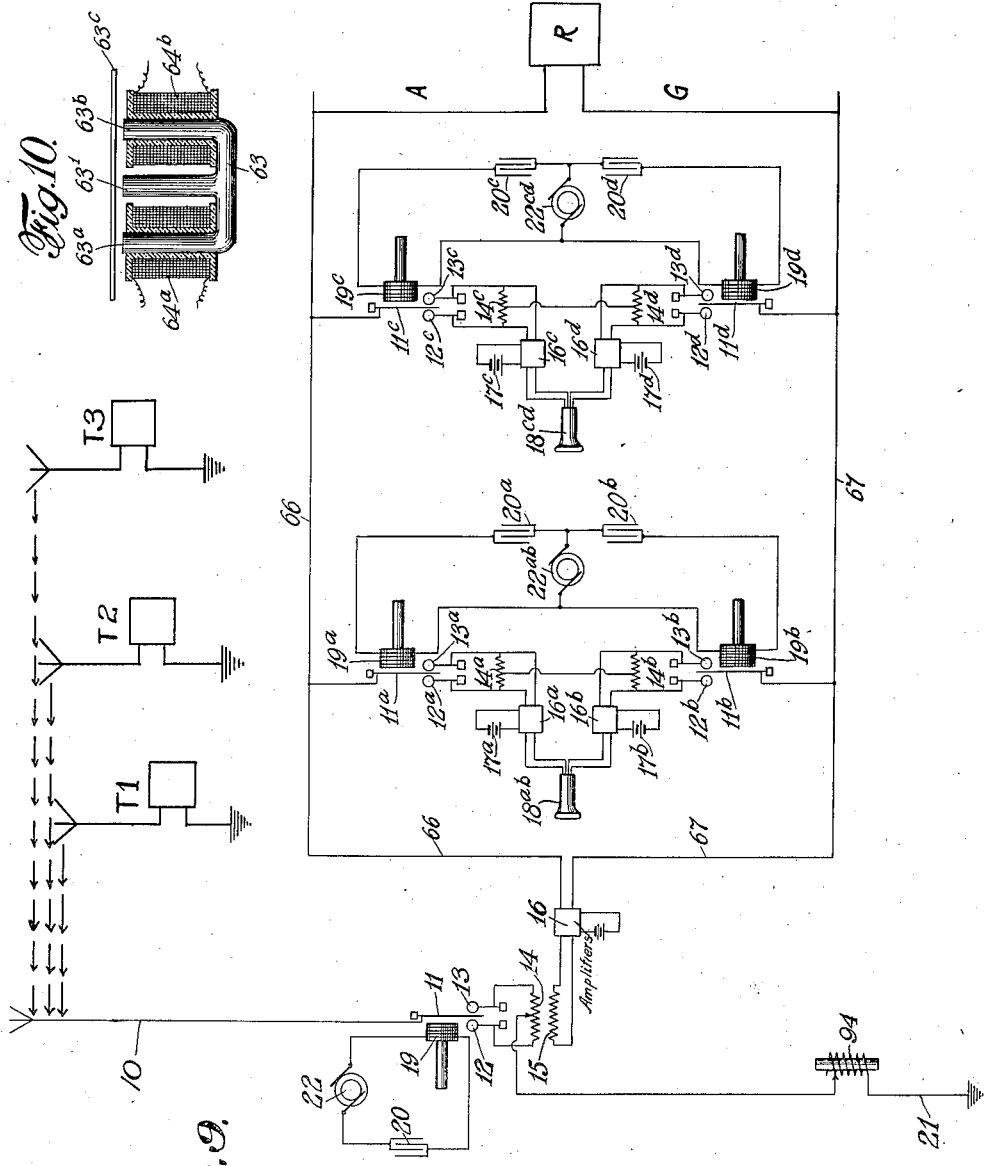

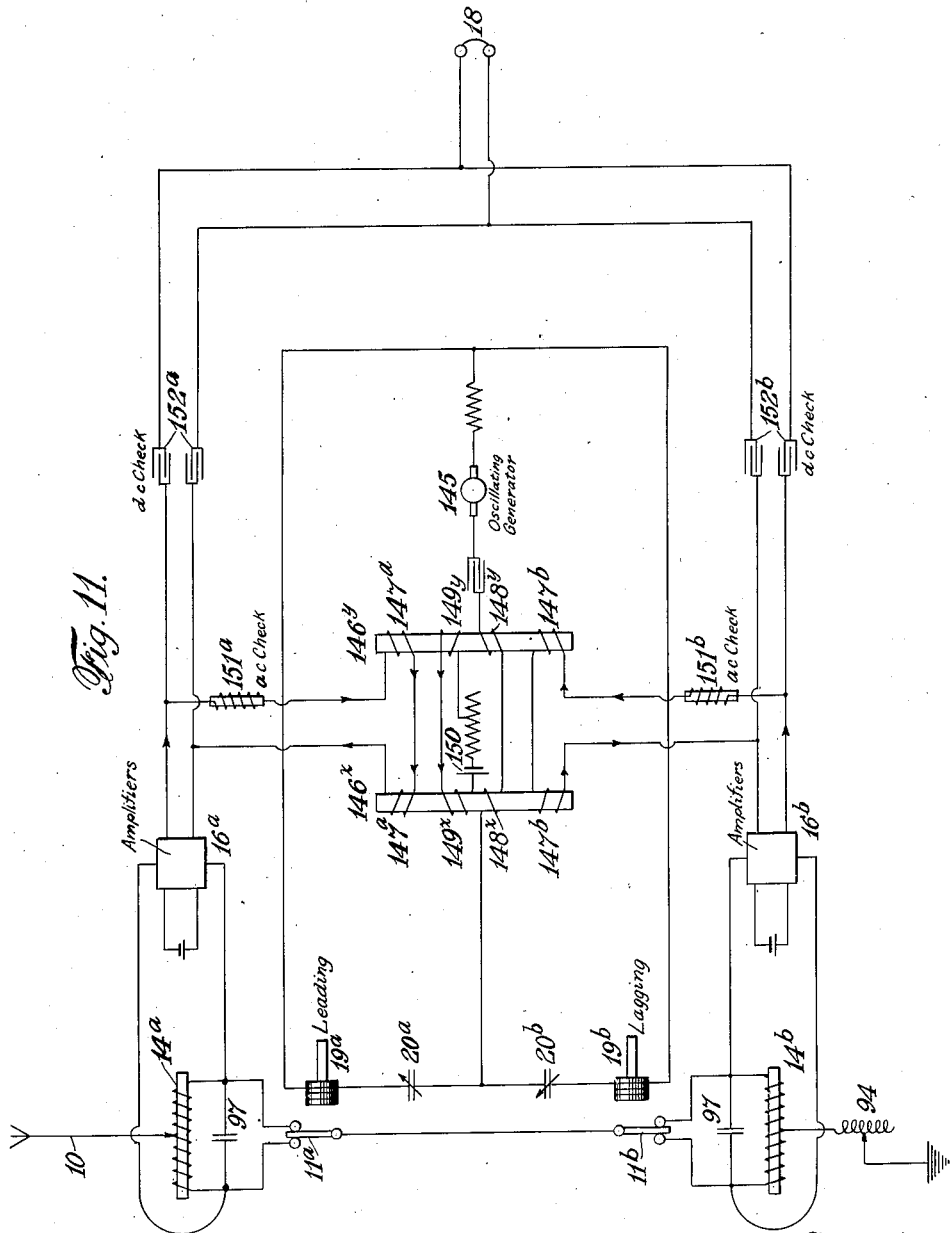

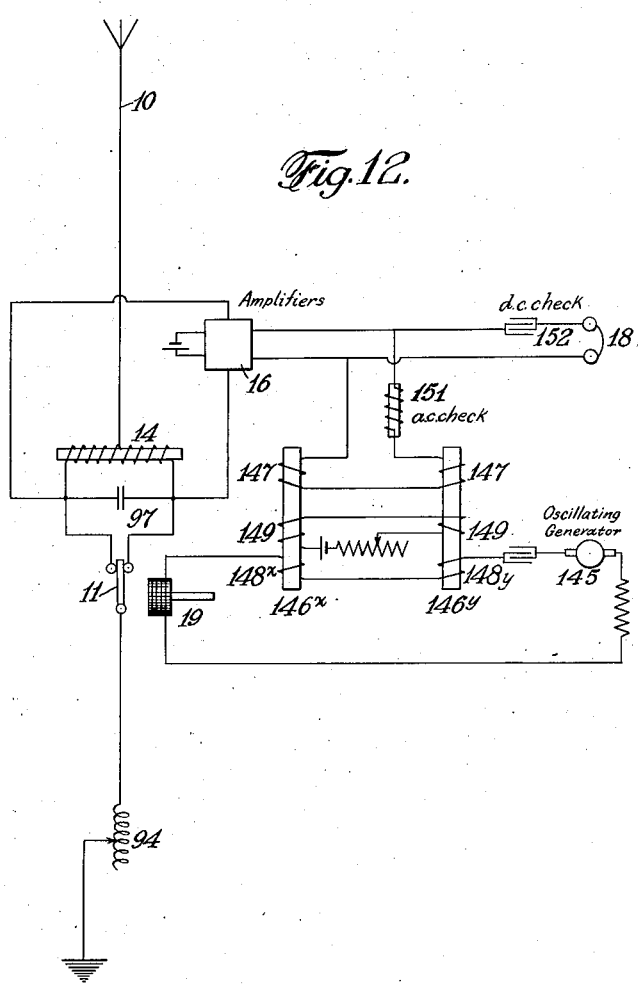

Patented Oct. 25, 1932

1,885,009

UNITED STATES PATENT OFFICE

ALBERT V. T. DAY, OF NEW ROCHELLE, NEW YORK

METHOD AND MEANS FOR ELECTRICAL SIGNALING AND CONTROL

Application filed January 25, 1919. Serial No. 273,054.

In addition to the invention disclosed and claimed herein, this specification also discloses additional invention claimed in my later application Serial Number 653,450, which will mature in my companion United States patent bearing the issue number consecutively following the number of the patent. For instance, my said companion patent claims the method herein designated as "phase-differentiated multiplexing," while this present patent claims the multiplexing differentiation between amplitude modulation and modulation of wave-length.

This invention consists in improvements in methods and apparatus for carrier-wave signaling and control, either by radio transmission, or through metallic circuits. This means that the invention in its broadest aspect, may employ a carrier-wave either to transmit a telephonic, telegraphic or other signal, or to transmit telematic control to any distant device, for instance a ship or submarine, or an aerial torpedo. But for brevity hereinafter, the terms "signal" or "signaling" or the like, unless particularly qualified, will be employed in the broadest sense to include not only what is ordinarily called "signaling", but also to include the transmission of said telematic control to distant devices in the manner of signals to which they are made inherently responsive.

These improvements are designed to increase the efficiency and excellence of transmission, and to reduce the disturbing effects of waves and currents foreign to the signal, and to accomplish the multiplex transmission of telegraph or telephone or other signals, and to accomplish simultaneous radio receiving and sending on a common aerial.

The said improvements are exemplified in the accompanying drawings, which will now be described in the order in which they are numbered.

Figure 1 is a diagram showing apparatus which may be employed in several different ways for receiving radio telegraph or telephone signals.

Figure 4A is a vector diagram of wave compositions which obtain in the detectors or demodulators of Figures 1, 2, 4, etc.

Figure 5 is a diagram of an apparatus for simultaneously sending and receiving telephone signals through a common aerial, and for multiplexing the received signals.

Figure 6 is a diagram of an apparatus for the mutiplex sending of radio telephone and telegraph signals.

Figure 7 is a diagram of an apparatus for the multiplex sending of radio telephone and telegraph signals.

Figure 8 is a diagram of an apparatus for transmitting the telegraphic signal through the field of the current-modulating generators of Figure 7.

Figure 9 is a diagram of apparatus for the multiplex receiving of radio telephone signals.

Figure 10 is a diagram of a receiver construction which may be employed in the system of Figure 9.

Figs. 11 and 12 are diagrams of apparatus for receiving radio telephone or telegraph signals.

All of the telephonic receiving means of the foregoing figures, are adapted for receiving telegraphic signals transmitted by carrier-wave modulation, for instance as transmitted in Figure 7, by the transmitting key 735 which controls the modulating wave of audio frequency superposed on the field of the radio-frequency generator 718.

Figure 2:
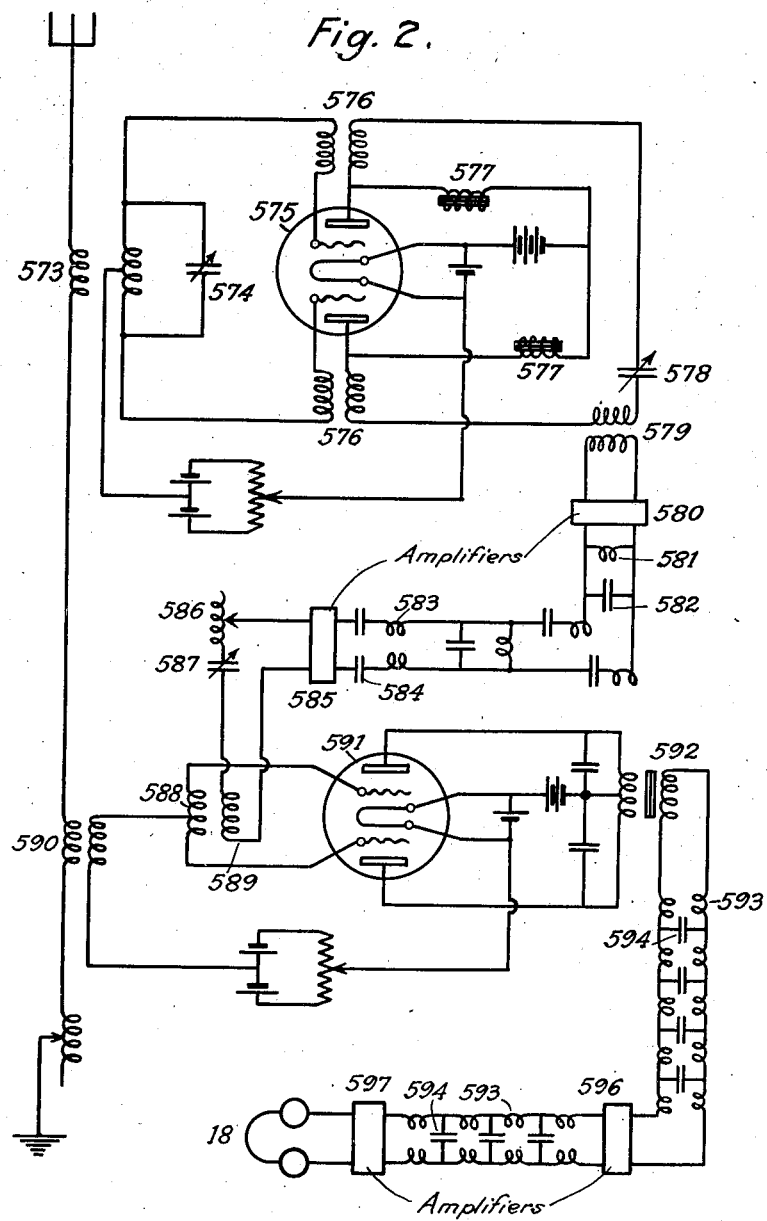
Figure 2 is a diagram of an apparatus particularly designed for receiving radio telephone signals.
Figure 4:
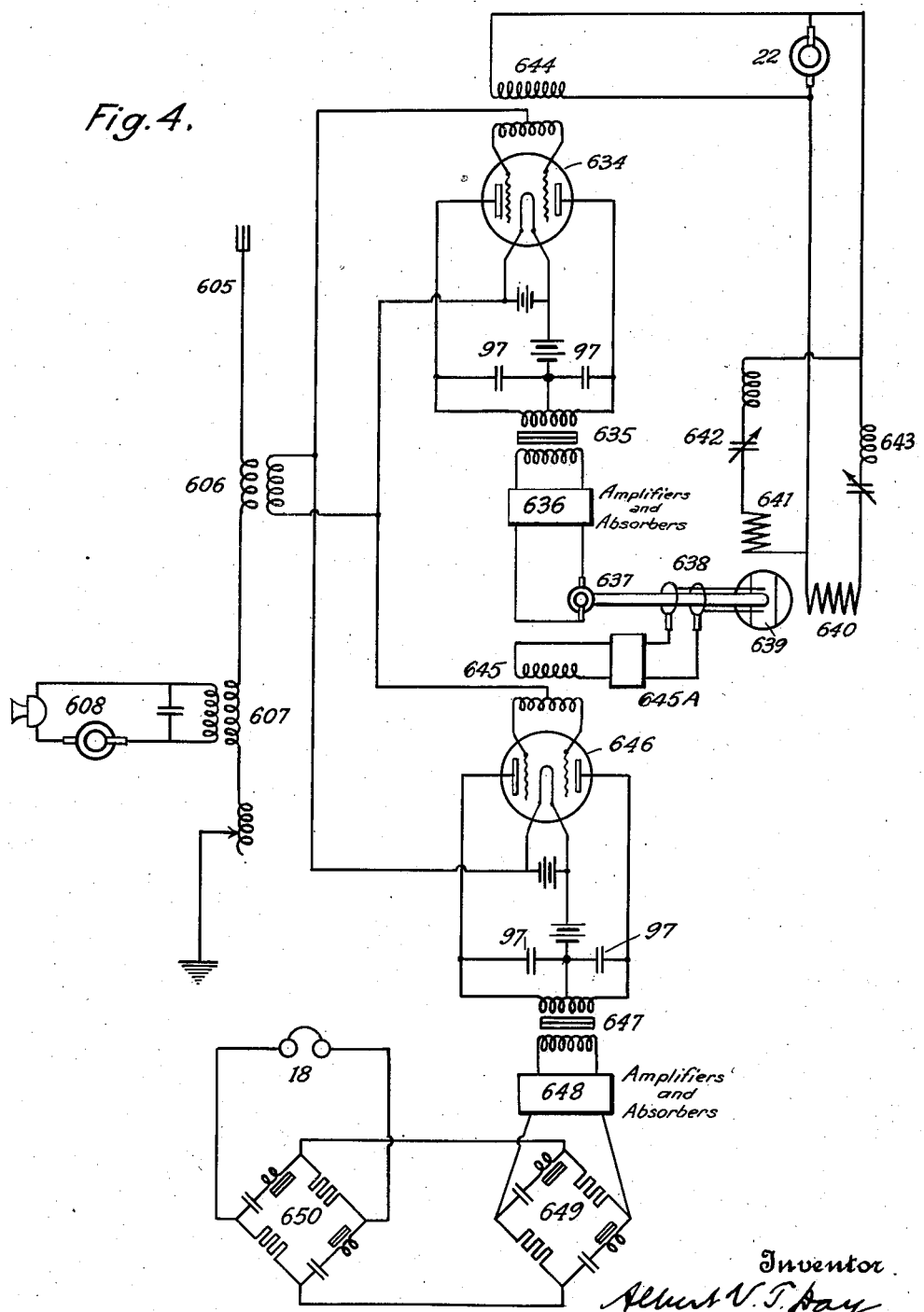
Figure 4 is a diagram of an apparatus particularly designed for receiving radio telephone signals, and indicates the means for simultaneous sending on the receiving aerial.

Figures 5 and 9 have been particularly mentioned as showing means for the multiplex receiving of signal-modulated carrier-waves, because these figures particularly illustrate the duplication of apparatus employed for this purpose; but it will be understood that the receiving means of Figures 1 and 2 and 4 which employ supplemental waves, are likewise designed for such multiplexing by mere duplication of so much of said means as may be necessary for that purpose. This duplication of apparatus for multiplexing has been particularly illustrated and described in the systems of Figures 5 and 9 because the manner of arranging these receiving means for this purpose, would not be so obvious from their showing as employed for one signal alone.

In the system of Figure 1, the duplex differential audion detector or demodulator 531 is acted upon jointly by aerial waves from the antenna 502, and supplemental or local waves from the generator 510. A potentiometer 506 is employed to adjust the mean potential of the detector grids 511b and 511c, so as to attain maximum detector efficiency. The condensers 544b and 544c permit the flow of radio frequency waves in the plate circuit of the battery 517, while their stored-up rectified current components are transmitted through the sections d, e and d, f of the primary of the audio transformer 518. The rectified or translated effects of aerial currents acting alone, are neutrally balanced in these two sections of the audio primary, so that the audio transformer 518 will transmit to the duplex differential audion amplifier 532, only the sustained wave of the generator 510, and the joint effects of the aerial and supplemental waves co-acting together on the detector 531.

Radio waves from the aerial circuit, when acting alone, will not unbalance the detector or demodulation effects to produce an unbalanced flow of rectified current through the transformer primaries d e and d f, but when the aerial and supplemental waves act together on the detector in phase consonance, then these two waves will reinforce each other in one of the detector grids, while tending to counteract each other in the opposite detector grid. Thus will be produced in the opposed primary coils of the audio transformer 518, an unbalancing of unidirectional current which will effectively vary with telephonic strength modulations in the received carrier-wave, providing the supplemental wave supplied from the local source 510 effects the detector grids in continuous synchronism and phase correspondence with the aerial wave. When the received carrier wave is phase-modulated as explained hereinafter, it will be superposed on the supplemental wave in phase quadrature, and its phase modulations will then produce unbalancing of the resultant wave in the opposite grids so as to vary the rectified wave in accord with such phase modulations.

The current supplied by the source 510 to the primary coil 508 of the radio transformer, may be maintained in synchronism with the received carrier-wave, for the purposes of telephony. This synchronism may be accomplished in various ways explained hereinafter. For instance, the generator 510 of Figure 1 may be the coil 639 of Figure 4. In this case the coupling leads 546 of Figure 1 would be employed to deliver aerial current to the heterodyne detector 634 of Figure 4.

Since the direct rectifying action of the aerial waves acting alone on the detector 531, is entirely balanced out of the audio transformer 518, it follows that the disturbing effects of atmospheric or other foreign currents, will be only such as produced by their co-action with the supplemental local waves from the source 510.

When the local source 510 delivers supplemental waves in synchronism with the carrier waves, for the purposes of telephony, the aerial 502 may be detuned to produce static or atmospheric interference waves or beat waves of very short length in the audio circuits. These interference or beat waves produced in the audio circuits of the detector 531, by joint action of the atmospheric waves and local supplemental waves, have a frequency which is equal to the difference between the frequency of the local waves and the free frequency of the atmospheric waves in the aerial 502. Therefore these interference waves in the audio circuits may be made as rapid as desired, by tuning the aerial 502 for a natural frequency different from the frequency of the supplemental local waves. Thus the foreign waves produced in the audio circuits by atmospherics may be rendered shorter than the telephonic voice waves.

In other words, the aerial 502 may be detuned from the frequency of the carrier-wave, so that its natural oscillations excited by atmospherics and other foreign waves, will have a frequency sufficiently different from the frequency of the carrier-wave and local source 510, to produce interference or beat frequencies of a very rapid order in the detector plate circuit and audio transformer 518. These foreign disturbances will thus be limited to exceedingly short waves which can be selectively suppressed in the audio circuits without suppressing the longer waves of the voice currents or signaling currents. Under these circumstances, of course, the carrier-wave is a forced wave in the aerial, and the foreign wave is a free wave, but the aerial will be tuned as near to the carrier-wave frequency as may be possible without incurring a too great length of the disturbing waves in the audio circuits resulting from co-action of the foreign waves and supplemental waves in the detector grids.

The secondary of the audio transformer 518 is connected to the grids 519b and 519c of the differential audion amplifier 532. This amplifier is so arranged that its output transformer 527 repeats all current waves transmitted by the transformer 518, while all rectifying effects of the short disturbing waves are balanced out of the transformer 527. Thus the comparatively long waves of the telephonic current, and the comparatively short waves produced by foreign currents in the aerial, are both amplified together, without increasing the wave length of the foreign disturbing currents.

In other words, the amplifier 532 and its output audio transformer, repeat all waves received from the audio transformer 518, without introducing additional longer wave effects due to rectification of the said waves from the transformer, 518. This is accomplished by connecting the secondary coil of the transformer 518 with the amplifier grids 519b and 519c so as to excite these grids equally, so that all waves transmitted by the transformer 518 will have equal rectifying effects in the opposite plate circuits 520b and 520c. These opposite plate circuits include the opposite parts of the primary of the transformer 527, and these opposed primary coils are disposed in opposite or balanced inductive relation to their common secondary, with respect to the direction of current flow from the battery 525.

Therefore the rectified components of battery current will have neutral inductive relation to the output of the transformer 527. But the current waves from the transformer 518 will be exactly transmitted through the amplifier 532 and transformer 527, because these waves will produce opposite instantaneous effects in the opposite grids and the opposite plate circuits of the amplifier.

The output current from the secondary of the transformer 527, consisting of the rectified telephonic waves and superposed shorter foreign waves, may be transmitted through any kind of wave filter, or device adapted to selectively suppress the foreign waves by virtue of their shorter length. Generally speaking, any device will serve the purpose which will transmit the telephonic waves more efficiently than the disturbing waves, because of the greater length of the telephonic waves.

The rectified telephonic current with its superposed shorter disturbing waves may now be transmitted through any suitable number of amplifiers in succession, such as 532, 533, and also through any suitable number of circuits or devices adapted to selectively suppress the shorter disturbing waves. For instance, as shown in the drawings, an artificial loaded transmission line 528, 529, may be employed for this purpose, its inductances 529 and capacities 528 being proportioned so as to efficiently transmit all waves of essential vocal or telephonic length, while the disturbing waves will be shorter than the minimum wave length for which the circuit is designed. Thus the telephonic current may be amplified and its superposed disturbances effectually suppressed, before its ultimate delivery to the telephone 538. In other words, the foreign disturbing waves will be suppressed in the loaded transmission lines 528, 529, and 536, 537, while the differential amplifiers 532 and 533 will build up the vocal or telephonic current to adequate audible value in the receiver 538.

The arrangement of Figure 1 may be employed for heterodyne receiving of telegraph messages transmitted in the usual way by establishing and discontinuing a wave train, but this use of the apparatus will be very different from its use in the practice of the method hereinafter claimed, wherein a carrier-wave-train is modulated to convey a telephonic signal or to convey a telegraphic signal in the manner of a telephonic signal by audio modulations of a carrier-wave. The employment of the apparatus of Figure 1 for heterodyne reception of ordinary telegraphic signals, is not claimed in this application. When the apparatus is to be used for this purpose, the local generator 510 will be employed to produce a current different from the fundamental or free frequency of the aerial 502, and a signaling wave will be employed with a frequency different from either the local generator or free aerial frequency. For instance, the signaling wave may advantageously have a frequency between the frequency of the local generator and the free frequency of the aerial. In any event, the differential or beat frequency effected by co-action of the local waves and the free antenna oscillations, may be very much higher than the heterodyne audio frequency effected by co-action of the signaling wave and the local wave. Thus the disturbing effects of atmospherics and foreign currents may be limited to short waves in the audio circuits, susceptible of being selectively suppressed, as before explained. In such heterodyne telegraph signaling the telephone receiver 538 would be employed as shown in the drawings.

The heterodyne action of the apparatus of Figure 1 may also be employed to receive signals conveyed in the modulations of a carrier-wave-train, if the resulting signaling beat waves be raised to a frequency sufficiently exceeding the vocal or modulation frequency. When this is done the disturbing beat waves due to atmospheric and foreign currents may still be rendered much shorter than the signaling beat waves simply by determining the relationship of local generator frequency, carrier-wave frequency, and free antenna frequency, as before explained. Therefore the disturbing waves can still be selectively suppressed by virtue of their shorter length in the output circuits of the detector, as before explained.

Now, when the frequency of the signaling beat wave is thus raised sufficiently above the vocal or modulation frequency, this signaling beat wave will at once constitute a secondary carrier-wave subject to all the telephonic or telegraphic modulations of the carrier-wave received from the atmosphere by the aerial 502.

Such a secondary carrier-wave may be transmitted through any suitable number of amplifiers, and through any suitable number of filtering circuits or devices merely adapted to suppress short waves disproportionately. When this is done, the relatively short disturbing waves will be effectively suppressed while all frequencies of audio modulation, such as voice modulation, can be transmitted with almost equal efficiency, and therefore without considerable distortion, because as they occur in the secondary carrier-wave they may be constituted in component waves whose frequencies differ from one another by a relatively small percentage as compared with their frequency-differentiation in the original modulating telephonic current. This need not be further explained, since it is well understood in the mathematics of carrier-wave modulation. For this purpose the line coils 529 might be simple resistances, so that with the condensers 528, they would approximate a co-action of resistance and capacity such as exists in an ordinary telephone line. It is well understood that an ordinary telephone line transmits short waves with much greater loss than long waves.

Or, the artificial telephone transmission line may have its capacities 528 and inductances 529, so proportioned as to transmit all modulation components of the secondary carrier-wave with equal efficiency, while the shorter disturbing waves may have less than the minimum wave length which the line is designed to efficiently transmit.

The secondary carrier-wave, thus filtered and amplified, may be transmitted through the switch 628 to a non-polarized telephone receiver 735 connected in series with a condenser tuned to the frequency of the secondary carrier-wave.

Or the secondary carrier-wave may be applied to the opposite grids of the duplex rectifier 629 so as to produce therein, opposite and equal instantaneous variations of potential, thus avoiding the usual repetition of the carrier-wave in the audio transformer 632 included in the plate circuit of the said rectifier. In these circumstances the audio transformer 632 will receive the rectified current component with the usual efficiency, and with a superposed alternating current having twice the carrier-wave frequency, and far less amplitude than the carrier-wave component usually transmitted through a rectifier. Hence, even if the secondary carrier-wave applied to the detector grids is not above the audible limit, its effects may become inaudible in the wave an octave higher in the audio circuit of the detector.

In any event, the carrier-wave may be short enough to carry all the essential vocal or telephonic waves, and yet may be long enough to be audible, in which instance its audibility may be tuned out, for example by a resonance bridge shown as interposed between the audio transformer 632 and the telephone 633. In this bridge one opposing pair of arms are simple ohmic resistances, while the other opposing pair of arms comprise inductance and capacity tuned to the wave to be silenced, and having the same ohmic component as the aforesaid simple ohmic resistances. These inductances and capacities thus neutralize each other at the frequency of the wave which may be eliminated, so that the bridge is thus balanced for the disturbing wave which therefore is not effectually applied to the telephone.

In the system of Figure 2 the aerial currents control the grid potentials of two differential audions 575 and 591. The audion 591 is employed as a demodulator or detector responsive to the joint action of the aerial waves and synchronous locally energized supplemental waves supplied by the transformer 589. The audion 575 is employed as an amplifier to supply said synchronous local waves to the transformer 589 and detector 591, in the following manner.

Although the aerial may be detuned as before explained, for the purposes of eliminating atmospherics and other disturbances, the secondary of the coupling 573 may be tuned for the fundamental or unmodulated component of the carrier-wave so as to respond most efficiently to the forced wave of this carrier frequency in the aerial. The duplex audion amplifier 575 amplifies the carrier-wave received from the aerial and delivers it through the radio transformer 579 without a rectified effect, because the rectified current components are balanced out of the primary of this transformer. Regenerative radio transformers 576 are employed, and the circuits may be tuned by the condensers 574 and 578 so as to be resonant to the fundamental component of the carrier-wave, while tending to suppress its modulations and all other waves. The differential amplifier 532 of Figure 1 could be employed in lieu of the regenerative amplifier 575.

From the radio transformer 579 the fundamental component of the carrier-wave may be transmitted through any desired number of amplifiers such as 580 and 585, which may be tuned to the carrier-wave. The reason why this amplifier cascade may be thus extended indefinitely through any number of amplifying stages is because the consequent overloading or saturation of an excess number of such stages will not impair its function of suppressing amplitude fluctuations in the wave which it transmits. So long as the cascade has enough stages to amplify its weakest input wave substantially up to the power limit of its final amplifying stage, the output wave amplitude of said final stage cannot be substantially increased or varied by any fluctuating increase of input wave amplitude. Thus the final output wave amplitude of the cascade will be rendered constant, and any number of additional or excess amplifying stages will merely become overloaded or saturated without impairing that constancy, so that the number of amplifying stages does not present the difficult problem of determination and power regulation imposed by a cascade required to faithfully repeat amplitude modulations. The carrier-wave may be transmitted also through any number of tuned circuits such as shown between these amplifiers 580 and 585. These tuned circuits include parallel inductance and capacity 581, 582 tuned to the fundamental carrier-wave, and series inductance and capacity 583, 584 also tuned to the fundamental carrier-wave. A sufficient number of tuning devices thus employed in sequence will effectually suppress the modulations of the carrier-wave while efficiently transmitting the fundamental component thereof. Similar tuning devices employed in sufficient number will eventually eliminate all foreign waves derived from atmospherics or other causes.

Thus will be produced in the output circuit of the final amplifier, a greatly amplified constant unmodulated wave of the fundamental carrier frequency; and this constant wave will be employed as the local or supplemental wave to energize the grids of the detector 591 through the radio transformer 589, 588. Inductance or capacity at any point in the course of transmission from the aerial coupling 573 to the transformer primary 589, may be adjusted so as to maintain this supplemental wave in required phase relation with the aerial carrier-wave from the coupling 590, as the two are superposed on the grids of the differential detector 591.

Thus the detector 591 delivers through its audio transformer 592, the rectified or demodulation telephonic current in response to the telephonic modulations of the carrier-wave, in accordance with the principles of modulation herein explained. This rectified telephonic current may be transmitted through any suitable number of amplifiers such as 596 and 597, and through any suitable number of loaded transmission circuits or other wave-filtering means adapted to transmit the vocal components while suppressing the much shorter disturbing waves induced by atmospherics, etc.

Generally considered, any known type of amplifier may be employed at 575, 580, 585, etc., but if the tuned regenerative amplifier be adopted, its feed-back coupling, for example, 576, must be insufficient to maintain wave generation or oscillation independent of control by the input waves received from the aerial, lest the synchronizing control of the supplement waves be lost.

In receiving strength-modulated signals it is not essential that the modulation component of the carrier-wave be suppressed in the transformer coil 589, except as this is incurred by the tuning which favors the fundamental unmodulated component. But when the amplitude of the supplemental wave in this coil 589 is rendered substantially constant by derivation through the amplifier cascade as before explained, its effect in the grids of the detector 591 is to reduce fading of the demodulated signal delivered at 592. This is because the strength of the demodulation wave will vary roughly as the product of the mean amplitudes of the unmodulated and modulated waves superposed on the grids from the coils 589 and 590 respectively, and when one of these factors is made constant their product wave will be more constant than when both factor waves vary together as they do when fading occurs in an ordinary detector. Of course this anti-fading function operates equally for signals carried by modulations of amplitude and signals carried by modulations of wave length as hereinafter described. Also in demodulating such length-modulated signals, the said suppression of strength fluctuations in the coil 589 eliminates therefrom the effects of undesired strength fluctuations caused either by said length-modulation or by independent amplitude modulations employed to transmit a separate signal on the same carrier as hereinafter explained. It should be noted that the unmodulated component of a radiated strength-modulated carrier-wave may be relatively minute, with a consequent saving in sending power, because its effective energy is derived at the receiving station.

Figure 3:
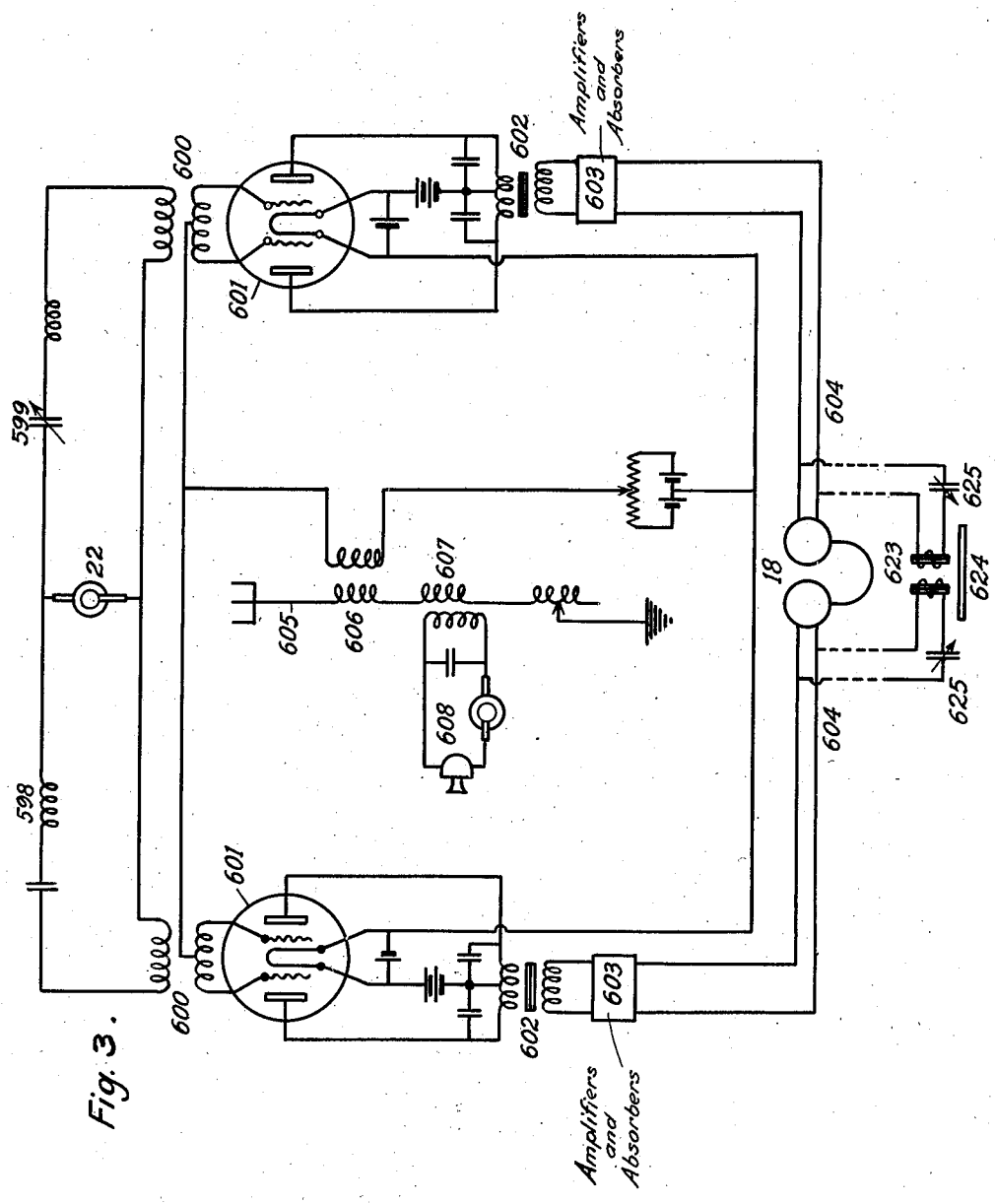
Figure 3 is a diagram showing apparatus for simultaneous sending and receiving of aerial telephone signals.

In the system of Figure 3, the aerial 605 may be detuned from the frequency of the carrier-wave which it is receiving, while the transmitting apparatus 608 may operate at the free frequency of the aerial. As before explained, this free frequency in the aerial need not disturb the received signals derived from the forced carrier-wave in the aerial.

The apparatus of Figure 3 is not designed to maintain exact synchronism of the local supplemental wave and received carrier-wave, in the detector grids. On the contrary, the local wave is applied in such manner that its co-action with a strength modulated or length-modulated carrier-wave in the detector grids, will be continuously effective to sound the signal through one or both of the telephone receivers 18 when said waves have the same mean frequency with an indefinite or drifting mean phase relation, and will be continuously effective to produce a signal-conveying actuation of the single receiver diaphragm 624 when a strength-modulated carrier-wave and the local wave have different frequencies.

The local or supplemental wave is produced by the generator 22 and divided into two phases approximately in quadrature with each other in the primaries of the radio transformers 600. Now, if the carrier-wave and local wave have virtually the same frequency, then as the phase of the local wave is slowly advanced or retarded in relation to the mean phase of the received carrier-wave, the two waves will occur in effective phase relation in the grids of one detector 601 so as to co-act with efficiency in that detector, while in the grids of the other detector 601 the local and carrier-waves are occurring in non-effective phase relation so that their co-action has no substantial effect on the audio circuit of the detector. Each of the rectifiers 601 may independently operate a separate telephone receiver through circuits including suitable amplifying and wave-filtering means such as before described, and indicated at 603 in this figure. These two telephones may be mounted on a common head-piece 18 and held at the operator's ears, so that one ear or the other will continually receive the telephonic signal.

It should be noted that in the foregoing employment of the apparatus of Figure 3, the constant component of a strength-modulated carrier-wave may be entirely dispensed with: that is to say a strength-modulated carrier-wave may be employed which has a zero mean value, as hereinafter explained.

The apparatus of Figure 3 may be employed for strength-modulated heterodyne telephone receiving in the following manner:

The local source will deliver a frequency different from the carrier-wave frequency, and their resultant differential or beat currents in the detector output circuits, will be amplified by the amplifiers 603 and employed to energize respective alternating-current magnets 623, symmetrically co-acting on a common telephonic diaghragm 624, so that their joint attraction thereon will always be as the sum of the squares of their instantaneous field-strengths, or currents. These beat currents in the magnets 623 will occur in quadrature, so long as the two detectors are excited in quadrature by the local source 22. The sum of the squares of these quadrature currents in the magnets 623 will be constant while their current waves are constant, so that their current waves will be entirely inaudible so long as they are not varied, even though they are of audible harmonic frequency. But when varied by telephonic modulations of the strength of the received carrier-wave, the joint attraction of the two magnets 623 will vary accordingly, and actuate the telephonic diaphragms 624. If the frequency of the beat waves is high in the audible range, or above the audible range, it will be desirable to counteract the resulting inductance of the magnets 623, by capacities 625 tuned to the beat frequency. This will also assist in selective suppression of foreign noises.

When the apparatus of Figure 3 is employed for simultaneous receiving and sending, it will co-operate with a distant station whose aerial is tuned for sending the carrier-wave to be received as a forced wave in the aerial 605. At the same time the local source at the distant station will be adjusted to produce that frequency which is necessary to co-act with the carrier-wave frequency of the transmitting apparatus 608 sending the free carrier-wave from the aerial 605 to be received as a forced wave in the distant aerial.

Obviously, the receiving means of Figures 1 and 2, may be employed in the same general scheme for receiving a carrier-wave different from the natural antenna frequency, while simultaneously sending from the same antenna a carrier-wave having the natural antenna frequency.

The system of Figure 4 employs the same general scheme for sending with a carrier-wave of the natural antenna frequency, while simultaneously receiving with a carrier-wave of different frequency. In this system the duplex demodulator or detector 646 receives the forced carrier-wave from the aerial coupling 606, and receives a synchronous local or supplemental wave through the transformer 645 from the inductor coil 639 whose frequency and phase are determined in the following manner.

The carrier-wave received by aerial 605 is transmitted to an additional duplex audion detector 634. As before explained, this detector is balanced so that it will transmit no effects through its output audio transformer 635, when the detector grids are excited only by waves from the aerial acting alone. But these detector grids are simultaneously excited by high-frequency waves transmitted through the transformer 644 from the local generator 22. This local generator 22 has a frequency different from the received carrier-wave, so that when the detector grids are excited simultaneously by both these waves, the detector will deliver through its output transformer 635, a heterodyne current having a frequency adapted to impel a synchronous motor.

This beat-current or motor-impelling current delivered by the transformer 635 is passed through a number of amplifiers which may be tuned to its frequency, and is also passed through any desired number of wave filters or resonant circuits tending to suppress all currents of different frequency. In the diagram these amplifiers and wave-filtering means are presumed to reside in the box 636. The beat frequency to be passed through this selective box is relatively so low that the frequencies to be suppressed therein are differentiated from said beat frequency by a much higher percentage than obtains in the aerial circuit. Thereby all modulations and foreign frequencies can be more readily suppressed. The desired beat-current is thus amplified in such degree as to synchronously drive the synchronous motor 637, while the filtering or tuning means will sufficiently suppress the other beat-currents produced in the transformer secondary 635 by co-action of the local source 22 with the sending generator 608, or with any aerial current foreign to the received carrier-wave.

The synchronous motor 637 rotates an inductor coil or generating coil 639, which is disposed in the rotary field produced by the coils 640 and 641 energized in quadrature phase relation by current from the generator 22. Now, the frequency of the current induced in the inductor coil 639 must be the frequency of the rotary-field 640, 641, plus or minus the angular velocity of the inductor coil 639. Since the inductor coil 639 rotates at a frequency which is the difference between the received carrier-wave frequency and the local frequency 22, its rotation therefore may be employed to add or subtract this differential frequency to or from the current induced in the coil from the rotary-field which has the frequency of the local generator 22. Thus the output current of the coil 639 may be maintained in exact synchronism with the mean phase of the received carrier-wave.

The current thus produced by the coil 639 is transmitted through a collector 638 and transformer 645 to the grids of the detector 646. Any number of amplifiers, tuned circuits and wave-filters may be introduced in the box 645A in the course of transmission from the inductor coil 639 to the transformer 645, in order to amplify the desired local wave and eliminate any modulations which it may derive from rotation of the coil 639. Thus the transformer 645 and detector 646 are supplied with a local wave of constant amplitude, one advantage of which is the reduction of fading effects in the demodulated signaling wave as explained in connection with the detector 591 of Figure 2. Also, the desired mean phase relation of the received carrier-wave and local or supplemental wave superposed on the grids, may be adjusted by shifting the angular position of the stationary coils 640 and 641 which produce the rotary field.

The detector 646 delivers the rectified telephonic current or demodulation current through the audio transformer 647 and through suitable amplifiers and wave-filtering means indicated at 648, and thence to the telephone 18.

If atmospherics are to be disregarded, then the free frequency of the aerial 605 and sending generator 608, may be so near to that of the inductor 639, that audible beats would be produced, and these may be tuned out by the tuning bridges 649 and 650, and as many more as may be desired. These bridges operate on the balancing principle explained with respect to the bridge for the telephone 633 in Figure 1. When connected in succession as at 649 and 650 of Figure 4, these bridges may be respectively tuned for different beat frequencies, so as to successively eliminate as many foreign signaling currents as may occur to produce audible beats in the detector 646.

In Figure 5 the sending coupling is represented at 714, and the receiving coupling at 715. The local generator 22 produces a supplemental wave differing in frequency from the mean frequency of the received carrier-wave, so as to produce the beat frequency through the differential detector 676, for propelling the synchronous motor 686, through current-amplifying and wave-filtering means 682.

The waves from the local generator 22 are divided into quadrature phases in the transformers 671 and 672, so that they will produce through their respective differential detectors 674 and 675, beat-currents in quadrature with each other in the audio transformers 677 and 678. These quadrature currents in the transformers 677 and 678, are of course synchronous with the beat-current in the audio transformer 679. Therefore when the beat-currents derived through the transformers 677 and 678 are conveyed through suitable amplifying and wave-filtering means at 680 and 681, they will produce through the quadrature field-coils 683, and 684, a rotary-field having the same mean angular velocity as the synchronous motor 686. Therefore, when the two coils 685 and 708 are mechanically rotated by the armature 686 in the direction of the rotary-field 683, 684, these coils 685 and 708 will maintain a fixed angular relation with respect to the rotating axis of said field, so long as the said field axis rotates at a constant velocity. But if the rotary field is subjected to slight accelerations and retardations occurring alternately, then the coils 685 and 708 will still rotate at the mean field-velocity, so that the rotating field axis will have a fixed mean position relative to these mechanically rotated coils.

The heterodyne or beat-currents which flow in the coils 683 and 684 to produce the rotary field, are derived from co-action of the local wave, and the received carrier-wave, superposed in the detectors 674 and 675. This co-action is such that the strength and phase of these beat-currents will vary with the strength and phase of the carrier-wave. Therefore the strength and angular velocity of the rotary field will also vary with the strength and phase of the received carrier-wave. These accelerations and retardations of current phase and rotary-field velocity, may be designated either as phase librations or phase modulations.

One of the mechanically rotated coils, for instance 685, will be disposed with the rotary field axis passing continually through the axis of the coil, so that this coil 685 will be subject to induced electromotive force by changes in the strength of the field, but will not be effectually acted upon by slight angular variations or librations of the rotary-field axis with respect to the coil axis. This coil 685 will therefore produce in the telephone 712 all vocal or telephonic waves resulting from the strength modulations in the received carrier-wave. But this telephone 712 will remain silent to small phase librations of the received carrier-wave resulting in slight phase librations of the rotary-field axis with respect to the coil 685, while said coil rotates at constant velocity because of its momentum.

The other coil 708 is disposed in the mean plane of the rotating field so that it will not receive secondary electro-motive-force from changes in field strength due to strength-modulations of the carrier wave, but will be efficiently energized with secondary currents resulting from phase librations of the rotary-field due to phase modulations of the carrier wave, which cause the field axis to oscillate forward and backward relative to the coil 708 which rotates at constant velocity.

Therefore if the aerial of Figure 5 receives a carrier-wave from a distant station, having its strength modulated by one telephonic transmitter, and having a phase modulation produced by another telephonic transmitter, the telephones 711 and 712 will respond each to one of the sending transmitters, without interference from the other transmitter.

Figure 6 shows one means of multiplex transmission for sending two telephonic signals simultaneously to separate receptors such as the telephones 711 and 712 of Figure 5. In Figure 6, the receiving coupling 715 may operate a receiving apparatus such as shown in Figure 5, while the sending coupling 714 will transmit a carrier-wave having the natural frequency of the aerial. This carrier-wave will be produced by the generator 693 whose field 713 is excited by the battery in series with the modulating transmitter 691, so that this transmitter modulates the strength of the outgoing wave without affecting its phase. The condenser 694 is adjusted for resonance with the inductance bridge 695 at the carrier-wave frequency of the generator 693, and the permeability of the iron cores of the inductance bridge varies with their degree of saturation as determined by current from the battery 690 and as modulated by current from the transmitter 688 through the transformer 689, so as to produce a libration or modulation in the phase of the carrier-wave which may be confined within limits which will not substantially modulate its strength.

The strength-modulating wave in the coil 713 may be omitted, and the apparatus of Figure 6 may be employed solely for transmitting the phase-modulated signal. In this specific apparatus the phase libration will never attain 180 degrees. Therefore it consists in a phase acceleration which increases the carrier wave frequency by less than a half cycle during one half cycle of the modulating wave, and a phase retardation which decelerates the carrier wave frequency by less than a half cycle during the ensuing half cycle of the modulating wave. Hence the numeric frequency-variation of the carrier wave is less than the actual frequency of the modulation which produces it, and the required frequency range or width of allocated signaling channel is correspondingly small. Thus the said frequency relation presents an advantage over ordinary strength-modulation which entails side-band frequencies differing from the basic carrier frequency by a range equal to the modulating frequency, and hence requiring a channel allocation of correspondingly wide range.

For instance, the usual strength-modulation of a 100 kilocycle carrier wave by a modulating wave of 1 kilocycle, entails two modulation waves or side-band waves of 99 and 101 kilocycles. Even if one of these side-bands is suppressed, the other still ranges 1 kilocycle, or 1 per cent., either above or below the basic carrier frequency, so as to require a wave channel at least 1 kilocycle wide, or 1 per cent. of the basic frequency. In comparison therewith, a 100 kilocycle carrier wave from the generator 693 of Fig. 6 may have its phase alternately accelerated and retarded 36 degrees, or 0.1 cycle, by a modulating wave of 1 kilocycle frequency from the generator 731 or microphone 688. Thus, the carrier wave is accelerated 0.1 cycle during 0.5 cycle of the modulating wave. That is, during the time lapse which would normally entail a carrier wave train of 50 cycles, each of said 50 waves is shortened only enough to cumulatively increase their total number from 50 cycles to 50.1 cycles. This would constitute a frequency increase of only 0.2 per cent. if the rate of carrier phase acceleration were uniform during said time lapse or half cycle of the modulating wave. But said rate of phase acceleration varies with the rate of change in the instantaneous ordinates of the sinusoidal modulating wave. Therefore, said 0.2 per cent. frequency increase must be multiplied by the ratio (3.1416:2) of maximum sinusoidal change to mean sinusoidal change in the modulating wave. This correction results in an actual carrier-frequency increase of about 0.3 per cent. at the instant of zero modulating current when the carrier waves are being most rapidly shortened and accelerated.

The said 0.3 per cent. increase of carrier frequency during one-half cycle of the modulating wave, is followed by a corresponding 0.3 per cent. decrease during the ensuing half cycle of modulating wave, so that the total carrier-frequency variation, and the required width of wave channel, is the sum of these opposite variations which aggregate only 0.6 per cent. of the basic carrier frequency, as compared with the 1.0 per cent. frequency range entailed in the side-band modulation above set forth. Moreover, the said 1.0 per cent. side-band range is irreducibly inherent in the ratio of modulating and carrier frequencies, whereas the said 0.6 per cent. carrier-frequency range entailed in the system of Fig. 6 is proportionate to the maximum allowed phase displacement which can be reduced at will much below the said 36 degrees assumed for convenient exposition.

Since the above described modulation of phase and frequency is actually constituted in modulations of the wave length of the carrier, it may be properly designated as "length modulation".

As before mentioned, when the transmitting station is required to radiate a length-modulated carrier wave without strength modulations, the current in the generator coil 713 of Figure 6 may be maintained constant and unmodulated. In any event the wave length and frequency of the voltage wave supplied by the source 693 is a fixed constant which maintains constancy of the mean frequency of the radiated wave irrespective of its phase or frequency modulations, and irrespective of accidental changes in the properties of the modulating elements 694, 695. In other words, the capacity and inductance 694, 695 are not incorporated as parts of an oscillation generator whose mean frequency they determine, but on the contrary, their mean resonant frequency may be varied in any degree without shifting the mean frequency of the radiated wave out the center of its allocated signaling channel. Thus when the allocated channel range is narrow and critical, the prime source of its carrier wave symbolized at 693 can be critically regulated as a master source to maintain the required channel frequency irrespective of the quality or number of its transmitting circuits symbolized at 695, 694, 727, 714.

The multiplexing procedure of Figures 5 and 6 has been explained as a separation which depends upon using a strength modulation of the carrier wave for one signal, and a phase modulation or frequency modulation of the carrier-wave for the other signal. Another transmitter for producing such a doubly modulated carrier wave will now be described in Figure 7.

In Fig. 7 the incoming carrier-wave having a frequency different from the natural antenna frequency is received through the aerial coupling 715, while the coupling 714 is employed to transmit the multiplex sending carrier-wave having the natural antenna frequency.

The generators 718 and 719 deliver synchronous electro-motive-force waves in 90 degrees phase relation.

First assume that the generator field-coils 729 and 730 are not excited.

Now the transmitter 722 will modulate the strength of both quadrature phase components of the carrier-wave simultaneously and equally, so as to modulate the strength of their resultant carrier-wave without changing its phase. Hence, as before explained, one telephone (for example 711 of Figure 5) will respond only to the resulting strength-modulation in the rotary-field 683, 684.

The transmitter 725 will modulate both quadrature phase components of the carrier-wave simultaneously and equally but in opposite directions of strength variation, so as to effect a limited phase libration of their resultant carrier-wave, without substantially modulating its resultant strength. Hence, as before explained, the other telephone (for example 712 of Figure 5) will respond only to the resulting phase libration in the rotary-field 683, 684.

Now assume that the generator field-coils 720 and 721 are not excited, but the generators are excited by currents in the field-coils 729 and 730, modulated by the transmitters 716 and 717 respectively. Thus the constant wave components of the two generators unite in quadrature or 90 degrees phase relation to form a resultant constant component of the carrier-wave, while the variable or strength-modulated components of the carrier-wave have zero mean value and are always differentiated by their quadrature phase relation with each other. This multiplex composition of two strength-modulated carrier waves is hereinafter designated as phase-differentiated multiplexing.

Now as the rotor coils 685 and 708 of Figure 5 rotate with the axis of the rotary field produced by the coils 683 and 684, the rotary field will have an unmodulated component in fixed angular relation to the rotor coils, and corresponding to the said constant component of the carrier-wave from the generators 718 and 719 of Figure 7. At the same time this rotary field will have two strength-modulated components of zero mean value in 90 degrees relation to each other, and both in fixed angular relation to the rotor coils. These strength-modulated field components correspond with the voice-modulated phase-differentiated carrier-wave components derived from the generators 718 and 719.

Each of the rotor coils will be disposed in neutral inductive relation to one of the strength-modulated field components, and will derive its rectified telephonic current from the other strength-modulated field component. Obviously this relation can be accomplished with any phase difference less than 180 degrees, but can be most efficiently accomplished with a phase difference of 90 degrees between the signal-modulated components of the carrier-wave. Thus the telephone 711 of Figure 5 will respond only to the transmitter 716 of Figure 7, and the telephone 712 will respond only to the transmitter 717.

It must be understood that the system of Figures 6 and 5 may dispense with the strength-modulated signal originating at 691 in Figure 6 and terminating at 712 in Figure 5. When this is done the range of phase modulation produced by the transmitter 688 will not be limited by the need of minimizing the distortive strength modulations which it entails, inasmuch as the system will include no strength-demodulating receiver to be disturbed by such distortions. The effect of said distortive strength modulations upon final reception of the phase-modulated signal in the receptor 711 will be nullified by those same functions of Figure 5 which eliminate a strength-modulated signal from said receptor. At the same time the same functions will likewise nullify the effects of all other distortive strength fluctuations occurring in the received phase-modulated wave from any other cause, such as an erratically variable attenuation of the radiated carrier in the transmission through the air.

Referring further to Figure 5, it will now be understood that the beat-currents in the two coils 683 and 684, are identical excepting for their phase difference. That is to say, the beat-current in either coil alone partakes of the strength-modulations and phase-modulations or frequency-modulations of the received carrier-wave, so that either current alone could be employed to produce the rotary-field in any well known manner. Obviously in this case also, the rotary-field must vary in strength and phase and frequency in accordance with the strength and phase and frequency changes in the received carrier-wave. Thus either beat current constitutes a secondary carrier wave whose strength and frequency modulations correspond with the primary carrier but whose mean frequency is lower than the primary mean frequency, so that the ratio of frequency modulation to mean frequency is greater in the secondary carrier than in the primary carrier. Demodulation is facilitated by thus translating the primary carrier into a secondary carrier having a greater percentage of frequency modulation.

Now, it will also be clear that the differential or beat-current produced in either of the rotary-field coils 683 or 684, may constitute a composite secondary carrier-wave including two strength-modulated components which are in quadrature with each other and which are modulated in accordance with the signaling modulations of the quadrature carrier-wave components received by the aerial in the phase-differentiated multiplexing; and it can be shown that this statement remains true even when these beat-currents have frequencies lower than the modulation frequency. In any event, it will be clear that the rotor 686, 685, 708 constitutes a means in which these secondary carrier-waves coact with local synchronous waves from the source 682, to translate the modulations of their quadrature phase-differentiated modulation-components into separate signal-conveying effects in the separate circuits leading to the respective telephones 711 and 712, through suitable amplifying and wave-filtering means 709—747 and 710—748.

As indicated in Figs. 6 and 7, each transmitter circuit may include two or more alternating-current generators, such as the generators 731, 732 in Fig. 6 and 741, 742 in Fig. 7. The generators thus included in each transmitter circuit will differ in frequency from each other, and will have longer wavelengths than the generators controlled by the transmitter circuits. These generators such as 731, 732, 741, 742 may be designated as modulating generators.

Each modulating generator may be connected into its transmitter circuit by a switch as indicated, and will thus superpose its waves on the audio voice waves in the transmitter circuit.

These waves of the modulating generators will thus become part of the composite modulating current for controlling the main carrier-wave generators.

Therefore the wave delivered by each modulating generator will be reproduced at the receiving station in the demodulator output circuit which responds to the sending transmitter associated with said modulating generator. For example, the waves of different frequencies delivered by the modulating generators 731 and 732 of Fig. 6 may be reproduced in the rotor coil 708 of Figure 5, and may be transmitted to the resonance magnets 743 and 744 tuned respectively to these different frequencies.

These resonance magnets 743 and 744 may be telegraph magnets responsive to a telegraph code transmitted by the keys at 731 and 732 of Figure 6; or ordinary polarized telephones may be employed at 743 and 744 to derive the telegraph signal as a musical note. Or the frequencies of the phase-modulating generators such as 731, 732, 741, 742 may be high enough to act as sub-carrier-waves for additional voice signals which may be introduced by transmitters 949, 950, 951, 952 employed to modulate the field strengths of these generators, as explained with respect to the main carrier-wave generators. In this instance the transmitting keys will of course remain closed, and the receiving magnets 743 and 744 will operate telephone receiver diaphragms. Or tuned rectifying circuits and polarized telephones may be employed in place of these resonance magnets. When the transmitting keys are continuously closed at 731, 732, 741, 742, the waves from their respective phase-modulating generators will maintain a continuous modulation of the wave-length of the main carrier wave. In some circumstances and conditions this continuous length-modulation will facilitate transmission and reception of the strength-modulated and/or length-modulated signals directly impressed on the main carrier from the transmitters 691, 688, 722, 725.

When the phase-modulating generators are thus employed to deliver telephonic sub-carrier-waves, the receiving apparatus such as 709 may omit such wave-filtering means as would unduly absorb these sub-carrier-waves.

Such use of frequency-differentiated sub-carrier waves to modulate the phase or wave-length of a super-carrier wave, accomplishes extensive multiplexing without increasing the radiated output power or the channel width of the super-carrier wave, because it does not superpose thereon the side-band waves of the usual strength modulation. The proposed wave-length modulation by the sub-carriers can be limited to any desired frequency range of the super-carrier. Preferably this super-carrier frequency range may be limited to a quantity less than the lowest sub-carrier frequency, so that all the sub-carrier frequencies can be carried through a signaling channel narrower than would be required for the lowest of them when carried by strength-modulation of the super-carrier.

When the devices 743 and 744 are to be actuated by currents of audio frequency, these currents may be eliminated from the telephone 711 by wave-filtering means in the box 747. This box 747 may also include such amplifying means as may be desired.

The devices 745 and 746 will respond to the appropriate modulating generators in accordance with the relations above explained. The modulating generators 733 to 740 of Figs. 6 and 7 may likewise be employed to selectively control the tuned receiving devices such as 743, 744, and 745, 746, of Fig. 5.

Obviously within the foregoing principles, any greater number of modulating generators may be combined in the circuit of either modulating transmitter of Figs. 6 or 7.

For suppressing the audible telegraph signals in the telephones 711 and 712 of Figure 5, the boxes 747 and 748 may contain successive resonance devices such as 649 and 650 of Figure 4. Means of this general character will most efficiently eliminate the telegraph wave-trains when their rise and decadence is gradual.

To accomplish a slow rise and decadence of the telegraph wave-trains, for instance from the modulating generator 737 of Figure 7, they may be controlled in the manner indicated in Figure 8. Here the inductances such as 944 and 946 co-operate with the capacities such as 945 and 947, to retard the rise and decadence of field-exciting current for the modulating generator, in response to the telegraph key 943. Also the output circuit of the modulating generator may include series resonance 750 and parallel resonance 749, tuned to the frequency of the generator so as to further prolong the rise and decadence of its telegraph wave-trains. When the key 943 is used, the key 751 will be kept closed. When the resonance alone is relied on, the key 751 will be used and the key 943 will be kept closed.

When the system of Figure 4 is to be employed for the phase-differentiated multiplex receiving, the two phase-differentiated modulation components of the received carrier-wave will be superposed on its constant component which is employed to excite the synchronizing detector 634.

As before explained, the detector 646 will not be effectually responsive to a modulation component of the carrier-wave unless it has such a phase relation with the local supplemental wave as will effect an unbalancing of rectified effects in the opposed plate circuits of the detector. When this phase relation does not obtain, the detector will be silent to the modulation component. Therefore any modulated component of the carrier-wave which is received on the grids of the detector 646, may be rendered ineffective to unbalance the detector and produce audio effects, when the local or supplemental wave derived from the armature 639 has the silent phase relation with said carrier-wave component in the grids, which can be accomplished by adjusting the angular position of the rotary-field coils 640, 641. At the same time the detector 646 will respond to the modulation component of any other phase, because there is only one phase relation of aerial and local waves in which they will not unbalance the detector when superposed on its grids.

Therefore, when the apparatus of Figure 4 is to be employed in the phase-differentiated multiplex receiving, the required duplicate detector like 646 will be connected with the coupling 606 and with a duplicate inductor coil such as 639 to be driven by the synchronous motor 637 or by a similar motor. The duplicate inductor coil thus impelled, will be rotated in a duplicate rotary-field such as 640, 641, derived from the same generator 22. Or the secondary of the coupling 606 may be connected with a complete duplicate of all the receiving apparatus shown in Figure 4. Now the phase of the local supplemental current delivered to this duplicate detector, may be adjusted for silence with respect to the aerial modulation component which operates the detector 646.

Also, the apparatus of Figure 4 may be employed for the phase-differentiated multiplexing in the following manner.

The two quadraphase modulation components of the received carrier-wave may be transmitted from the coupling 606, through a resonance bridge like 650, to two detectors like 646. The bridge will be tuned to the carrier-wave, and will thus eliminate its constant component, and will transmit only its modulation components to the detectors. In these circumstances each detector will remain neutral and unresponsive to that modulation component which is impressed on its grids in exact quadrature with the local wave from the inductor coil 639. Then obviously the two detectors may be supplied with local waves from two respective inductor coils like 639, disposed on one rotor in quadrature phase relation in the rotary-field 640—641.

When the above said duplicate detectors like 646 of Figure 4 are employed for multiplex reception of a carrier wave which is strength-modulated and also phase-modulated or frequency-modulated as before described, then the beat wave developed in the transformer 635 will have its strength and wave-length correspondingly modulated. As before explained, the filters or tuned circuits in the box 636 will suppress such strength modulations, and a sufficiently sharp tuning thereof will also tend to suppress the length-modulations. Also the rotary inertia of the motor-converter 637—639 will resist quick acceleration and deceleration and cause it to rotate at a substantially constant velocity determined by the mean frequency and phase of the beat wave.

Thus the inductor coil 639 developes a constant frequency equal to the received mean carrier frequency but without its length-modulations. When this constant wave is superposed in quadrature with the mean phase of the modulated wave in one detector like 646, the phase modulations of that wave increase the resultant wave amplitude in one grid while decreasing it in the opposite grid, and vice-versa, while the strength modulations of said wave do not unbalance the wave amplitudes in the opposite grids. Thus the phase modulations are translated into rectified waves in the plate circuits of that rectifier, while the strength modulations are neutralized and silenced. The other detector like 646 will have the modulated and the constant waves superposed on its grids in phase consonance for rectifying the strength modulations as before explained, while this superposed relation of the waves renders the phase modulations practically ineffective to unbalance the resultant grid waves and produce audible rectified waves. Of course when the carrier wave is subjected only to length-modulations, then a single detector like 646 will alone translate such modulations.

The detector 591 of Figure 2 is to be likewise employed in duplicate for separately rectifying strength-modulations and length-modulations. The tuning between the amplifiers 575 and 585 will be sharp enough to suppress phase and frequency modulations so as to deliver from 585 a constant wave of unmodulated phase. Such modulation suppression will be particularly easy to accomplish when the modulating frequency is high, for instance when one or more sub-carrier waves of carrier frequency are used as modulating waves. The resulting constant wave from 585 will be supplied to the duplicate detectors through duplicate circuits like 586, 587, 589, and the phase required for each circuit will be adjusted at 586, 587. Of course a single detector 591 will suffice when only length-modulations are to be rectified.

Figure 4A shows the vector composition of the modulated waves and the unmodulated supplemental waves as they are superposed in the grids of detectors such as 646 of Figure 4 and 591 of Figure 2, when such detectors are employed to demodulate a carrier wave whose phase is modulated by one signal and whose amplitude is modulated by another signal. This diagram can be conveniently explained in its application to said detector 646 of Figure 4.

The left and right grids respectively receive unmodulated waves O*l* and O*r* of opposite sign or phase from the transformer 645. Said grids also receive modulated waves *l*L and *r*R of identic sign or phase from the transformer 606. Said modulated waves are approximately in phase quadrature with said unmodulated waves. These superposed component waves combine to produce the resultant waves OL and OR in the left and right grids respectively. The relative lengths of the vectors *l*L and *r*R are exaggerated to increase their pictorial visibility, and the angles *l*OL and *r*OR are correspondingly exaggerated. In practice said modulated vectors *l*L and *r*R may be so short that they will produce resultants O*l* and OR nearly parallel with O*l* and O*r*, and nearly normal to *l*L and *r*R. Thus the vector lengths OL and OR will be negligibly altered by changes in the lengths of *l*L and *r*R representing fluctuations in the strength of the received signaling wave. Furthermore, while the modulated vectors *l*L and *r*R remain in phase quadrature with the unmodulated vectors O*l* and O*r*, the resultants OL and OR will be equally varied by changes in the lengths of said vectors *l*L and *r*R. Such equal changes of wave amplitudes in the opposite grids will have nil joint effect in the detector output transformer 647, and the phase modulation of the vectors *l*L and *r*R may be so limited that they will not depart from said quadrature mean angle far enough to substantially impair said equalizing effect of their amplitude fluctuations.

When the phase of the received carrier wave is modulated by a signal, the vectors *l*L and *r*R will rock or oscillate in relation to the unmodulated vectors O*l* and O*r*. For instance when the carrier phase is retarded the said modulated vectors may be shifted to *l*Y and *r*X respectively, so as to reduce the resultant wave amplitude in the left grid from OL to OY, while simultaneously increasing the resultant wave amplitude in the right grid from OR to OX. These opposite amplitude variations in the opposite detector grids produce a cumulative rectified voltage in the output circuit of the transformer 647, as before explained in discussion of the detector 531 of Figure 1. Likewise, when the carrier phase is advanced, the foregoing reactions are all reversed, as the wave amplitude OL in the left grid is increased while the wave amplitude OR in the right grid is diminished. Thus the phase modulation of the carrier wave in each grid circuit is converted into an amplitude modulation of the resultant wave therein, and these amplitude modulations are demodulated to convey the signal. Thus the detector demodulates the phase-modulated signal of the received carrier wave while neutralizing and nullifying its strength modulations or fluctuations.

The duplicate detector such as 646 which demodulates the amplitude modulations of the received carrier wave, operates by a composition of the modulated and unmodulated waves in phase consonance and phase opposition, as shown between *r*′ L′ of Figure 4A.

The supplemental or unmodulated waves O*l*′ and O*r*′ are impressed on the left and right grids respectively in opposite sign from each other, and in phase quadrature with the unmodulated waves O*l* and O*r* for the phase-demodulating detector. The modulated waves are identic in the grids of both detectors. The modulated vector *l*′L′ impressed on the left grid of the strength-demodulating detector is identic with the modulated vector *l*L impressed on the left grid of the phase-demodulating detector. Likewise the modulated vector *r*′R′ corresponds to the vector *r*R. The said superposition of waves superposes the modulation vector *r*′R′ in phase opposition to the unmodulated vector O*r*′ in the right grid, and superposes the modulation vector *l*′L′ in phase consonance with the unmodulated vector O*l*′ in the left grid. Thus an amplitude increase in said modulation vectors will increase the resultant wave amplitude OL′ in the left grid while decreasing the resultant amplitude OR′ in the right grid, and the reverse effect will be produced by decreasing the amplitude of the modulation vectors *l*′L′ and *r*′R′. In each instance said opposite amplitude variations in the opposite grids will have cumulative rectification effects in the detector output transformer 647, so as to effectually demodulate the amplitude modulations of the received carrier wave. At the same time the phase modulations of the carrier components *l*′L′ and *r*′R′ may be kept within limits which will not vary the amplitudes of the resultant grid waves enough to produce sensible interference.

When its right hand grid circuit and plate circuit are omitted the detector 646 functions as an ordinary detector. Then the modulated wave impressed on the remaining grid of the phase-demodulating tube should have a mean phase such as *l*Y normal to the resultant OY, so that the amplitude or length of the resultant vector OY will be most efficiently varied by phase modulations but not appreciably varied by strength modulations. In the strength demodulating tube the modulated wave $l^2Y^2$ is impressed on the remaining grid in phase consonance with *l*Y, and the unmodulated wave O$l^2$ is superposed on said grid in phase consonance with $l^2Y^2$ so that the resultant wave amplitude O$Y^2$ in said grid will be most effectually varied by strength modulations in $l^2Y^2$ but negligibly varied by properly limited phase modulations of $l^2Y^2$. Of course the phases of the supplemental grid waves O*l* and O$l^2$ can be readily adjusted for the above relations by any suitable means, for instance by shifting the angular position of the field coils 640 and 641 of Figure 4 as before described.

As before explained, the phase modulations of the carrier waves from Figures 6 and 7 constitute modulations of wave length and frequency which may be confined to a relatively narrow frequency range, while the strength-modulated signals from said transmitting stations entail side bands of much wider range requiring much wider signaling channels. When such strength-modulated signals from Figures 6 and 7 are dispensed with to avoid preempting such wide channels, other fluctuations of amplitude may still be impressed on the length-modulated or frequency-modulated waves received at the demodulating stations, for instance distortive amplitude modulations entailed in the length-modulating process at the sending stations, or erratic amplitude fluctuations or fading entailed by transmission through the air. In this instance the demodulators will still function to nullify the interfering and distortive effects of these erratic amplitude fluctuations in the same manner that they function to suppress strength-modulated signals in the process of demodulating the length-modulated or frequency-modulated signals. It has been explained that said distortive amplitude modulations caused by the length-modulating process may be rendered inconsiderable by limiting the scope of said length-modulations, but this proposal obtains mainly when such distortive strength-modulations would interfere with separate strength-modulated signals. When this interference consideration is not imposed it may often be desirable to employ a somewhat wider range of length-modulation, relying on the receiver to eliminate resulting strength fluctuations from the length-demodulating process.

When the receiving apparatus of Figure 2 is duplicated for the phase-differentiated multiplexing, the duplicate detectors like 591 will receive the modulation components from the coupling 590, while the phase adjustment in each detector will be such as to eliminate the signal of that modulation component intended to operate the other detector.

Or, the entire receiving apparatus of Figure 2 may be duplicated, with the exception of the aerial; and the two receiving sets may be connected to their common aerial through independent couplings having their primaries arranged either in parallel or series in the aerial circuit. In this instance also, the local wave for the detector of each set, will have its phase adjusted to silence all effects of the carrier-wave modulation component which actuates the companion set.

Obviously, the apparatus of Figure 1, when employed with synchronized carrier-waves and local waves, may be likewise duplicated to perform the multiplexing methods of my invention, if its duplicate sets are supplied with synchronous local waves properly phase-adjusted, by any of the means herein described.

Also, the apparatus of Figure 1, as employed for heterodyne telephone receiving, may perform the multiplexing methods of my invention, because its heterodyne beat-wave delivered by the detector 531, constitutes a secondary carrier-wave characterized by all the phase-components and strength-modulations and length-modulations of the carrier-wave received through the aerial. That is to say, the secondary carrier-wave delivered at the receiving point 735 for instance, may include any combinations of components and modulations hereinbefore described, and hence may be selectively received at 735 by any of the means already described for selective response to these respective modulation components.

It has been mentioned that the apparatus of Figure 3 will continuously receive a telephonic signal transmitted on a carrier-wave of zero mean value, without a constant component. It will be understood that the activity of any transmitter shown in Figure 7 will produce such a carrier-wave, if it be assumed that the fields of the generators 718 and 719 are maintained at zero mean strength. Obviously, this could be done by having the field-coil 720 balanced against the field-coil 729, and the field-coil 721 balanced against the field-coil 730.

Figure 9 diagrammatically represents an adaptation of the co-action of carrier-waves and local supplemental waves, to the purpose of frequency-differentiated multiplex telephony. For diagrammatic simplicity, the rectifiers effecting the co-action of the local and carrier currents, are shown as mechanical rectifiers of the vibrating reed type, but in practice the audion type may of course be substituted. However, as shown in Figure 9 the local radio-frequency generator 22 energizes a telephonic polarized magnet 19, the inductance of which may be neutralized by the condenser 20. This magnet actuates a contact reed 11 which engages opposite contact members 12 and 13. The reed is only required to move a molecular distance in order to alternately increase its contact resistance with its opposed contacts 12 and 13. Thus the reed and its contacts act as a pole-changer to rectify the currents received in the aerial 10.

The rectified effects of the aerial currents are transmitted through the balanced transformer consisting in the primary coils 14 and secondary coil 15.

The received carrier-wave may be conceived as a composite wave including several component primary carrier-waves of different radio frequencies, controlled by independent modulating means. For example, these component wave-trains in the aerial might come from any of the independent sending aerials before described and located at different points T1, T2, T3, etc. In any event the frequencies of these component carrier-waves thus conceived will be so differentiated, that the heterodyne action of the rectifier 11 will convert them into different beat frequencies in the circuit of the transformer secondary 15. The wave trains of different frequencies thus resulting in the output coil 15, will constitute secondary carrier-waves characterized by the phase components and strength modulations and/or length modulations of the primary carrier-waves from which they are respectively derived. For the purpose of telephonic multiplexing, the frequencies of these secondary carrier-waves will be above the audible limit, and will be so different that they may be effectually separated by any suitable tuning means or selective means, known to technicians. This selective separation is greatly facilitated by the frequency-reducing process between the aerial circuit and the output coil 15, which increases the percentage of frequency differentiation between adjacent secondary carrier-waves. Thus the different secondary carrier-waves may be employed to actuate different receiving detectors or rectifiers of any suitable character, without interference, and this is particularly important when the received primary carrier waves are length-modulated and have their mean channel frequencies differentiated by a minute percentage. Such primary carrier waves may be superposed in the ether without channel overlapping even when spaced so close that their selective separation would be impracticable without first increasing the percentage of their frequency differentiation. The translation which thus increases the percentage of frequency differentiation between adjacent channels, at the same time converts each primary carrier having a given percentage of frequency modulation into a secondary carrier having a greater percentage of frequency modulation, so as to facilitate the process of demodulation.

Figure 9 indicates an amplifying means at 16, by which the secondary carrier-waves may be amplified for transmission to the metallic transmission line 66—67. This diagram shows only three selective receiving devices connected between the wires 66 and 67, but any number of secondary carrier-waves may be employed, with a corresponding number of selective detectors.

The variety of selective receiving means available for connection between the multiplex receiving wires 66 and 67 of Figure 9, may be exemplified by noting that the receiving means of Figures 2, 3, 4 and 5 may be employed simply by connecting their aerial circuits between the wires 66 and 67. This is illustrated by the box R representing said receiving means, and the wire A representing its aerial, and the wire G representing its ground connection. Each receiving means will of course have its own local wave frequency and its tuning adapted for receiving only one of the secondary carrier-waves in the wires 66 and 67. When such secondary carrier-waves are strength-modulated, they may be selectively rectified by the specific means of Figure 9 which will now be described.

In Figure 9, two receiving telephones 18a b and 18c d are operated in multiplex on the transmission line 66—67. Since they are operated by similar means, it will suffice to describe the operation of one of them, for instance the telephone 18a b.

The local generator 22a b produces a wave-train of the same frequency as the secondary carrier-wave which is to operate the receiving telephone 18a b. The current from this local generator operates two polarized telephone magnets 19a and 19b in quadrature phase relation, which is accomplished by adjusting the capacities 20a and 20b. These polarized magnets actuate the pole-changers 11a and 11b in quadrature phase relation, so that always one or the other will be effectually rectifying the secondary carrier-wave of the same frequency received from the transmission line 66—67. In this instance it is assumed that each secondary carrier-wave has a mean value, or constant component, which will be rectified into a uni-directional current. Of course the telephonic modulations of the secondary carrier-wave will also be rectified into telephonic variations of this uni-directional current.

Each rectifier 11a and 11b transmits its rectified current to an amplifying apparatus 16a or 16b. These amplifying means are adapted to amplify the uni-directional currents received from the pole-changers. These uni-directional currents energize independent non-polarized electro-magnets acting on a common diaphragm in the receiver 18a b, so that always one or both magnets will be effective on this diaphragm.

One form of such a receiver magnet is shown in Figure 10. Here the separate coils 64a and 64b have independent inner cores 63a and 63b, with a middle core $63^1$ common to both magnetic circuits. These magnetic circuits attract their common receiver diaphragm 63c.

When one rectifier is operating in quadrature with its respective secondary carrier-wave, its electro-magnet will receive no rectified component of the secondary carrier-wave, and will therefore be entirely non-effective on the diaphragm, but at this instant the other rectifier will be operating in phase consonance with the secondary carrier-wave, so as to supply to its magnet, the maximum rectified component of the secondary carrier-wave to actuate the receiver diaphragm. As the phase relation of the secondary carrier-wave and the local wave from 22a b, shifts or drifts, changing from the relation above assumed, the idle electro-magnet will gradually come into action, while the active magnet will gradually go out of action, but the sum of their audible effects on their common receiver diaphragm will be theoretically constant.

So long as the secondary carrier-wave is not being modulated, the sum of its rectified attractions exerted through the two electro-magnets, will be a constant force on their common receiver diaphragm. This is because any frequency difference between the secondary carrier-wave and the local wave from 22a b, will merely produce in the two magnets, sinusoidal heterodyne beat-waves in quadrature with each other, and the sum of their magnetic attractions will always be as the sum of the squares of their currents, which will be a constant for sinusoidal currents in quadrature phase relation. Therefore, the frequency of the local waves from 22a b may differ from the secondary carrier-wave frequency without rendering the heterodyne beat audible, while the mean attraction of the two electro-magnets will still be varied in accordance with the signaling modulations of the secondary carrier-wave, so as to produce the signal. It is merely necessary that every other wave in the wires 66—67 which is foreign to the telephone 18a b (for instance the other secondary carrier-waves) shall differ from the local wave of 22a b sufficiently to render a much higher heterodyne beat-wave in the output circuits of the rectifiers 11a and 11b, so that these foreign beat-waves may be selectively suppressed by virtue of their short wave-length, all as before explained.

Figures 11 and 12 show means adapted to receive either strength-modulated or length-modulated carrier-waves.

In Figure 11:

The local high-frequency generator 145 is an oscillating generator whose frequency can be determined and varied automatically by controlling the relation of inductance and capacity in its circuit. In this instance the high-frequency signaling current automatically maintains its co-ordination with the local high-frequency current by automatically maintaining the local current in continuous synchronism. Hence in this case there is no differential frequency and the rectified current from each rectifier will have a constant sign or direction subject to the modulations of the voice or the telegraph code, which modulations may of course be regarded as alternating currents superposed on the unidirectional current.

These alternating or voice currents pass from the rectifiers 11a and 11b through the large condensers 152a and 152b respectively to the common receiver 18, while the unidirectional currents pass through the choke coils 151a and 151b respectively and through the frequency-controlling coils 147a and 147b respectively. The battery 150 magnetizes the frequency-controlling cores 146x and 146y. If the rectifier 11a is in leading phase relation to the mean phase of the aerial current and the rectifier 11b in lagging phase relation thereto, then the rectified current from the leading rectifier 11a will be passed through the coils 147a in the direction opposed to the magnetizing force of the battery coils while the rectified current from the lagging rectifier 11b will be passed through the coils 147b in battery-reinforcing direction. Hence when the said lead and lag are equal so as to produce equal rectified currents, the joint M. M. F. of the coils 147a and 147b will be nil and the battery M. M. F. will be neither increased nor diminished.

The net unidirectional M. M. F. effective on the cores 146x and 146y of course determine their approach toward saturation and hence their permeability and consequently the measure of inductance which they introduce into their coils 148x and 148y included in series with each other in the circuit of the oscillating local generator 145. These last coils in the generator circuit are connected in different sign relations to the battery M. M. F. effective on their respective cores, so that the core saturation will have no asymmetric effect on the current waves produced by the generator.

The generator is adjusted as nearly as possible to produce exact synchronism with the aerial high-frequency current when the cores 146x and 146y are polarized by the exact M. M. F. of the battery coils neither increased nor diminished. Now if the generator frequency tends to drift ahead the leading rectifier 11a increases its mean phase lead ahead of the aerial current and thus reduces its rectified current in the coils 147a, while the lagging rectifier 11b reduces its lag behind the aerial current and thus increases its rectified current in the coils 147b. Thus the battery M. M. F. on the frequency-controlling cores is reduced by the difference in M. M. F. of the coils 147a and 147b, and the effective permeability of the cores is thereby increased to introduce more inductance into the coils 148x and 148y included in the circuit of the generator, so as to instantly curb its tendency to accelerate in frequency. Manifestly when it tends to retard or lag in phase, the opposite reaction is effected. Manifestly also, the same corrective reactions will ensue if the generator frequency tends to remain constant while the aerial mean phase tends to drift, or if both tend to drift oppositely or similarly.

In Figure 12:

Here the principle of co-ordination expounded on Figure 11, is applied to a single rectifier. The oscillating local generator 145 is adjusted to produce synchronism when the battery M. M. F. is modified by a given rectified current in the coils 147 which will be produced therein by the rectifier when operating with a given mean phase difference from the aerial current. If this difference is to be a phase lead of the rectifier, its rectified current will be delivered through the coils 147 in battery-supporting direction, but if the rectifier phase is to lag behind the aerial current, its rectified current will energize these coils in the battery-opposing direction. The consequent reactions accord with those of Figure 11.

It is to be understood in general, that all kinds of demodulators and detectors and rectifiers may be adapted to the general principles herein disclosed. Also the various types of demodulators illustrated in the several drawings may be interchanged. For instance, balanced differential audion detectors like 531 of Figure 1, may be employed in the receiving system of Figure 5, in lieu of the balanced crystal detectors 674, 675 and 676. These crystal detectors, or asymmetric detectors, are so balanced and connected that the aerial currents acting alone will produce no rectified effects in their output circuits.

In general, it may be said of the rectifier arrangements, that either the aerial current acting alone, or the local current acting alone, will produce no rectification effective in the output circuits of the rectifiers. Effective rectification is produced only by coaction of the aerial and local waves, simultaneously impressed on the detectors. Therefore in general, it will be possible to transpose the aerial detector connections and the connections of the detector with the local source. For example, in Figure 2, the transformer coil 589 may be placed in the aerial circuit, and the transformer coil 590 may be placed in the output circuit of the amplifier 585.

Generally it may be better to connect the aerials to the detectors in the manner shown in the drawings, because these connections serve to eliminate from the rectified circuits, all radio-frequency currents or oscillations produced in the aerial by atmospherics.

It has been explained that the aerials may be detuned from the received carrier-wave frequency, to avoid interference from static oscillations, and permit a simultaneous sending wave of free frequency in the aerial. But when these desiderata are to be disregarded, the aerial may be tuned to the received carrier-wave, with a consequent gain in receiving efficiency, for instance as shown at 574 in Fig. 2.

Although the accompanying diagrams represent apparatus for radio signaling, the invention is equally adapted for use with conductive metallic transmission circuits, wherein the carrier-waves will be transmitted through such circuits in lieu of the atmosphere. In this case, what have been termed the "aerial currents", will be the currents in the transmission circuit.

For the purpose of defining my invention in the following claims I shall employ the expersion "carrier-wave" to designate a wave-train which carries one or more other waves in the form of signal-conveying modulations impressed on the "carrier-wave".

Also, for the purposes of defining my invention in the claims, I shall employ the expression "supplemental waves" broadly to designate the waves of one or more wave-trains co-acting with the signal-modulated carrier-wave-train at the place where the carrier-waves are to be rectified or translated. Although it will generally be a great advantage to generate these "supplemental waves" or the greater part of their effective energy, at the local station where they coact with the modulated carrier-wave-train, they may in some instances be generated at points remote from said local station, and the claims not otherwise limited are intended to include such practice.

Also, for the purpose of defining my invention in the following claims, I shall use the expression "elemental carrier wave" to designate the occurrence of any carrier wave whenever and wherever it is independently transmitted on its own wave length instead of being carried on a superior carrier wave of higher frequency. For instance, the frequency-differentiated carrier waves impressed on the transmission line 66—67 of Figure 9 are still elemental carrier waves, notwithstanding their frequency has been translated by the heterodyne detector at 19. Also, a signal-modulated wave of sub-carrier frequency from the generator 731 of Figure 6 constitutes an elemental carrier wave in the circuit 731, 689, 690, but is not an elemental carrier wave where it is carried by the super-carrier in the circuit 694, 727, 714, etc. It is not an elemental carrier where it is still carried by the same super-carrier received in the circuit 714, 715 of Figure 5, but it is reproduced as an elemental carrier in the circuit 743 or 744 of Figure 5.

This invention, dealing with the diversely variable possibilities of arrangement obtaining in the coactions of wave-trains, and particularly composite wave-trains, is peculiarly susceptible of practise in widely differing ways which may depart far from the specific examples particularly illustrated and described, without however departing from the broad principles and procedure of the invention, which I hereby claim, as follows:

1. The method of translating the signal of a carrier-wave-train including a signal-modulated component and an unmodulated fundamental component, which consists in conveying the signal-modulated component to translating means by one course, amplifying the unmodulated component and conveying it to the same translating means by another course, and deriving a signal-conveying effect from coaction of both said wave-components in said translating means.

2. The method of translating the signal of a modulated carrier-wave-train superposed on an unmodulated fundamental synchronous wave-train, which consists in conveying the signal-modulated wave-train to translating means by one course, selectively amplifying the unmodulated wave-train while conveying it to the same translating means by another course, and deriving a signal-conveying effect from coaction of the signal-modulated waves and the amplified unmodulated wave-train in said translating means.

3. The method of receiving a signal-modulated carrier-wave-train superposed on a supplemental wave-train, which consists in conveying the signal-modulated wave-train to translating means by one course, conveying the supplemental wave-train to the same translating means by another course while amplifying and filtering it to suppress other waves, and deriving a signal-conveying effect from the coaction of the signal-modulated wave-train and the supplemental wave-train in the translating means.

4. The signaling method which consists in producing a carrier current in inductive relation to a magnetic circuit, modulating the wave length of said current by modulating the permeability of its said magnetic circuit, and translating the resulting wave-length modulations to convey the signal.

5. The signaling method which consists in producing a carrier current in inductive relation to a magnetic circuit, modulating the wave length of said current by modulating the permeability of its said magnetic circuit, separately modulating the strength of said carrier current, and translating its length modulations and strength modulations to render separate signals.

6. The signaling method which consists in producing a signaling wave, controlling its amplitude and wave-length by different signals, and translating it to render said signals.

7. The signaling method which consists in producing a carrier wave, modulating its strength and wave-length by separate signaling waves, and translating it to render said signaling waves.

8. The signaling method which consists in producing a carrier wave, modulating its strength and wave-length by separate signals, and translating it to render said signals by coaction with supplemental waves at a receiving point.

9. The signaling method which consists in producing a super-carrier wave and a number of signal-modulated sub-carrier waves, modulating the strength of the super-carrier by one or more of the sub-carriers and modulating the wave-length of the super-carrier by another of the sub-carriers, translating the super-carrier modulations to reproduce the sub-carriers, and translating said reproduced sub-carriers to render their signals.

10. The signaling method which consists in producing a super-carrier wave, modulating its strength by one signal and its wave-length by a signal-modulated sub-carrier wave translating said strength modulations to convey one signal and translating said length modulations to reproduce the sub-carrier, and translating the reproduced sub-carrier to convey a second signal.

11. The signaling method which consists in producing a number of frequency-differentiated sub-carrier waves modulated by separate signals, employing them to modulate the wave-length of a common super-carrier wave, transmitting the resulting complex wave, and translating it to render the separate signals.

12. The signaling method which consists in modulating a number of frequency-differentiated sub-carrier waves by separate signals, employing them to modulate the wave-length of a common super-carrier wave, transmitting the super-carrier and translating it to reproduce the sub-carriers, and translating the reproduced sub-carriers to convey the separate signals.

13. The method which consists in modulating the amplitudes of frequency-differentiated sub-carrier waves by separate signals, employing the strength-modulated sub-carriers to modulate the wave-length of a common super-carrier wave, transmitting the super-carrier and translating it to reproduce the strength-modulated sub-carriers, and translating the reproduced sub-carriers to render their separate signals.

14. The signaling method which consists in producing a number of frequency-differentiated elemental carrier waves, modulating the frequency of each by a different signal wave, transmitting them through a common medium, causing the elemental carrier waves to coact with a supplemental wave, deriving from said coaction an equal number of frequency-differentiated secondary carrier waves with respectively corresponding frequency modulations, and selectively deriving the several signals from their respective secondary carriers.

15. The signaling method which consists in producing a number of frequency-differentiated parent elemental carrier waves, modulating the frequency of each by a different signal wave, transmitting them through a common medium, causing the elemental carriers to coact with a supplemental wave whose frequency differs from all of them, deriving from said coaction a secondary carrier wave corresponding with each parent carrier and having corresponding frequency modulations and a mean frequency which is the beat difference between the parent mean frequency and the supplemental wave frequency, and selectively translating the resulting frequency-differentiated secondary carriers to separately convey the signals of their respective parent carriers.

16. The method which consists in producing a carrier wave, modulating its fundamental wave-length simultaneously by a signaling wave and another wave, transmitting the carrier thus modulated as an elemental carrier-wave through a transmitting medium to a receiving point, and translating said modulations of the fundamental wave length of the received elemental carrier to convey the signaling wave.

17. The method which consists in producing a carrier-wave, modulating it directly by a signaling wave while modulating its wave-length by another wave of higher frequency than said signaling wave, transmitting the carrier thus modulated as an elemental carrier-wave through a transmitting medium to a receiving point, and translating it to convey the said signaling wave.

18. The signaling method which consists in producing a super-carrier wave and a signal-modulated sub-carrier wave, employing the sub-carrier to modulate the super-carrier wave-length within a limited frequency range less than the frequency of the modulating sub-carrier, transmitting the super-carrier thus modulated, and translating its length-modulations to convey the signal.

19. The signaling method which consists in producing a super-carrier wave and a number of frequency-differentiated sub-carrier waves modulated by separate signals, employing all said sub-carriers to modulate the super-carrier wave-length within a limited frequency range less than the lowest sub-carrier frequency, transmitting the super-carrier thus modulated, translating it to reproduce the signal-modulated sub-carriers, and translating the reproduced sub-carriers convey their respective signals.

20. A quadrilateral wave-suppressing circuit including inductance and capacity in each of two opposite circuit legs tuned to the undesired wave, resistance in each remaining circuit leg, input terminals at two opposite corners of the quadra-circuit, and output terminals at the remaining opposite corners.

21. A quadrilateral wave-suppressing circuit including inductance and capacity in each of two opposite circuit legs, resistance in each remaining circuit leg, input terminals at two opposite corners of the quadra-circuit, and output terminals at two points where the undesired wave produces synchronous equal potentials or nil potential difference.

22. The method of wave derivation which consists in causing a modulated wave of given frequency to coact with supplemental waves of different frequency, deriving from said coaction a wave of the differential frequency, and suppressing the modulations in the derived wave.

23. The method of wave derivation which consists in causing a modulated wave to coact with supplemental waves, deriving a secondary modulated wave from said coaction, and deriving an unmodulated wave from coaction of the secondary and supplemental waves by suppressing the effects of modulation of the secondary wave in the latter coaction.

24. The method of wave derivation which consists in causing a first modulated wave to coact with supplemental waves of different frequency, deriving from said coaction a second modulated wave of the differential frequency, causing said differential wave to coact with said supplemental waves while suppressing its modulation effects in such coaction, and deriving from the latter coaction an unmodulated third wave synchronous with the first modulated wave.

25. The demodulating method which consists in causing a first modulated wave to coact with supplemental waves of different frequency, deriving from said coaction a second modulated wave of the differential frequency causing said differential wave to coact with said supplemental waves while suppressing its modulation effects in such coaction, deriving from the latter coaction an unmodulated third wave synchronous with the first modulated wave, and employing a coaction of said synchronous first and third waves to render the demodulation current.

26. The signal receiving method which consists in demodulating a modulated carrier wave by coaction with a supplemental wave while deriving said supplemental wave from the modulated carrier wave and determining its derived frequency by the received mean carrier frequency and suppressing its modulation effects in the source of said derivation.

27. The wave modulating method which consists in superposing two synchronous phase-differentiated wave components, and employing a signaling wave to modulate their relative strengths and thus modulate their resultant phase and consequently accelerate and decelerate their resultant period.

28. The signaling method which consists in superposing two synchronous phase-differentiated wave components, employing one signaling wave to increase and decrease their strengths simultaneously and thus modulate their resultant strength, employing another signaling wave to modulate their strengths oppositely and thus modulate their resultant phase and accelerate and decelerate their resultant period, transmitting the resultant wave this modulated, and translating its modulations to convey their respective signals.

29. The method which consists in receiving a modulated wave, providing a supplemental wave under the influence of the inductive action of a magnetic circuit as determined by its permeability, varying said permeability by a coaction of said waves to maintain the supplemental wave in a coactive frequency relation with the received wave, and deriving from coaction of said waves an effect of the modulation of the received wave.

30. The method of controlling a supplemental wave by a received wave which consists in receiving a wave, providing a supplemental wave under the influence of the inductive action of a magnetic circuit as determined by its permeability, and influencing said permeability by changes in the periodicity relations of the received and supplemental waves.

31. The receiving method which consists in intercepting a radiated elemental carrier wave whose fundamental frequency in the air is modulated by a given percentage of its mean frequency, translating said intercepted wave into a secondary carrier wave having corresponding frequency modulations constituting a greater percentage of the mean frequency of the secondary carrier, and deriving the signal from the secondary carrier.

32. The receiving method which consists in intercepting a radiated elemental carrier wave whose fundamental frequency is modulated by a signal, causing said intercepted wave to coact with supplemental waves whose frequency differs from the mean fundamental frequency of said intercepted carrier, deriving from said coaction a secondary carrier wave of the differential frequency lower than said intercepted mean frequency and having corresponding frequency modulations, and deriving the signal from the secondary carrier.

33. The method which consists in receiving a signal-modulated carrier wave, causing it to coact with a supplemental wave, deriving from said coaction a secondary wave, employing the secondary wave to synchronously control a mechanical rotation, and translating the carrier wave to render its signal while controlling said translation by the mechanical rotation.

34. The method which consists in receiving a signal-modulated carrier wave, deriving therefrom a synchronizing wave of lower frequency than the carrier frequency, amplifying the synchronizing wave, maintaining mechanical rotations under control of the synchronizing wave, and translating the carrier wave to render its signal while controlling said translation by said rotations.

35. The method which consists in receiving a signal-modulated carrier wave, maintaining mechanical rotations at the receiving place while employing the carrier wave to control them, and translating the carrier wave to render its signal while controlling said translations by said mechanical rotations.

36. The method which consists in producing an electrical carrier wave and a signaling wave, employing the signaling wave to modulate the phase of the carrier wave within limits of 180 degrees, transmitting the modulated carrier from a sending station as an elemental electric carrier wave through a transmitting medium to a receiving station and thus conveying the signal between stations by phase-modulation of the fundamental carrier wave in said medium, and deriving from said phase-modulations of the received elemental carrier a reproduction of the signaling wave.

37. The signaling method which consists in producing a voltage wave of carrier frequency, deriving therefrom a synchronous carrier current, employing a signaling wave to modulate the carrier current by liberating its phase in relation to said voltage wave, transmitting said carrier current from a sending station as an elemental electric carrier wave through a transmission medium to a receiving station, and thus conveying the signal between stations by phase-modulation of the fundamental carrier wave in said medium, and deriving from said phase-modulation of the received elemental carrier wave a reproduction of the signaling wave.

38. The signaling method which consists in producing a continuous voltage wave of carrier frequency and unmodulated phase, deriving therefrom a carrier current wave, modulating the phase of said carrier current wave by a signaling wave, transmitting said phase-modulated carrier current from a sending station as an elemental electric carrier wave through a transmission medium to a receiving station, and thus conveying the signal between stations by phase-modulation of the fundamental carrier wave in said medium, and deriving the signaling wave from said phase-modulation of the received elemental carrier wave; whereby the carrier wave in the transmission medium is maintained in a channel whose mean frequency is the said voltage wave frequency.

39. The signaling method which consists in producing a carrier wave, modulating its phase by a signaling wave, transmitting it from a sending station as a phase-modulated elemental carrier wave through a transmission medium to a receiving station and thus conveying the signal between stations by phase-modulation of the fundamental carrier wave in said medium, causing the received elemental carrier to coact with supplemental waves, and deriving the signaling wave from phase-modulations of the received elemental carrier in its said coaction with the supplemental waves.

40. The signaling method which consists in producing an electrical carrier wave and a signaling wave, modulating the phase of said electrical carrier wave by said signaling wave, transmitting said carrier wave from a sending station as an elemental phase-modulated carrier wave through a transmission medium to a receiving station and thus conveying the signal between stations by phase-modulation of the fundamental carrier wave in said medium, causing the received elemental carrier to coact with supplemental electrical waves maintained in synchronism with the mean phase of the received elemental carrier wave, and deriving the signaling wave from effect of the phase-modulations of the received elemental carrier in its said coaction with the supplemental waves.

41. The signaling method which consists in producing a super-carrier wave, modulating its wave-length by a signal-modulated sub-carrier wave, transmitting the length-modulated super-carrier as an elemental carrier wave through a transmission medium to a receiving point, and deriving the signal from said wave-length modulations of the received super-carriage.

42. The signaling method which consists in producing a super-carrier wave and a sub-carrier wave, modulating the wave-length of the super-carrier by the sub-carrier and modulating the sub-carrier by a signaling wave, transmitting the length-modulated super-carrier as an elemental carrier wave through a transmission medium to a receiving point, deriving from said length-modulation of the received super-carrier a reproduction of the sub-carrier, and deriving from the reproduced sub-carrier a reproduction of the signaling wave.

43. The signaling method which consists in producing a voltage wave of constant unmodulated frequency, deriving therefrom a continuous carrier current wave, producing a signaling wave and employing it to modulate the frequency of said current wave, transmitting said frequency-modulated wave from a sending station as an elemental carrier wave through a transmission medium to a receiving station and thus conveying the signal between stations by modulation of the fundamental carrier frequency of the elemental wave in said medium, and deriving the signaling wave from said frequency-modulation of the received elemental carrier wave.

44. The signaling method which consists in producing a voltage wave, deriving therefrom a continuous carrier current wave, producing also a signaling wave, modulating the frequency of said current wave by said signaling wave without correspondingly modulating the voltage wave, transmitting said frequency-modulated current wave from a sending station as an elemental carrier wave through a transmission medium to a receiving station and thus conveying the signal between stations by modulation of the fundamental carrier frequency of the elemental wave in said medium, and deriving the signal wave from said frequency-modulation of the received elemental carrier wave.

45. The signaling method which consists in producing a master voltage wave and a carrier current wave and a signaling wave, regulating the mean carrier frequency of said current wave by said master voltage wave while modulating said carrier current frequency by said signaling wave without correspondingly modulating said master voltage wave, transmitting said frequency-modulated wave from a sending station as an elemental carrier wave through a transmission medium to a receiving station and thus conveying the signal between stations by modulation of the fundamental carrier frequency of the elemental wave in said medium, and deriving the signaling wave from said frequency-modulation of the received elemental carrier wave.

46. The signaling method which consists in producing a carrier wave and an electrical signaling wave, modulating the frequency of said carrier wave by said electrical signaling wave, transmitting said frequency-modulated wave from a sending station as an elemental carrier wave through a transmission medium to a receiving station, causing the received elemental carrier wave to coact with supplemental waves, and deriving the electrical signaling wave from effects of the frequency-modulation of the received elemental carrier in said coaction.

47. The signaling method which consists in producing a carrier wave and a signaling wave, modulating the frequency of said carrier wave by said signaling wave, transmitting said frequency-modulated wave as an elemental carrier wave from a sending station through a transmission medium to a receiving station, causing the received elemental carrier wave to coact with supplemental waves of different frequency, deriving from said coaction a frequency-modulated secondary wave of the differential frequency, and deriving from the frequency modulation of said secondary wave a reproduction of the signaling wave.

48. The signaling method which consists in producing a number of frequency-differentiated signaling waves and controlling them by separate signals, employing them to modulate the wave-length of a common carrier-wave, transmitting the resulting length-modulated wave to a receiving point, and translating it to render the separate signals.

49. The signaling method which consists in producing a number of frequency-differentiated signaling waves, controlling them by different separate signals, employing them to modulate the wave-length of a common carrier wave, transmitting the resulting length-modulated wave from a sending station as an elemental carrier wave through a transmission medium to a receiving point, selectively deriving the separate frequency-differentiated signaling waves from the length modulations of the received elemental carrier, and employing said derived signaling waves to render their separate signals.

50. The signaling method which consists in producing a number of frequency-differentiated signaling waves, controlling them by separate signals, employing them to modulate the wave-length of a common carrier-wave while limiting its resulting frequency variations to a range less than the lowest modulating frequency, transmitting the resulting length-modulated wave to a receiving point, and translating its length-modulations to render the separate signals.

51. The signaling method which consists in producing a number of frequency-differentiated signaling waves, controlling them by separate signals, employing them to modulate the wave-length of a common carrier-wave while limiting its resulting frequency variations to a range less than the lowest modulating frequency, transmitting the resulting length-modulated wave as an elemental carrier wave through a transmission medium to a receiving point, selectively deriving the separate frequency-differentiated signaling waves from the length-modulations of the received elemental carrier, and employing said derived signaling waves to render their separate signals.

52. The signaling method which consists in producing a number of frequency-differentiated sub-carrier waves while modulating them by separate signals, employing them to modulate the wave-length of a common super-carrier wave while limiting its resulting frequency variations to a range less than the lowest modulating frequency, transmitting the resulting complex wave, and translating its length-modulations to render the separate signals.

53. The signaling method which consists in producing a signaling wave of definite frequency and a carrier wave, modulating the wave-length of said carrier wave by said signaling wave while limiting the resulting frequency variations of said carrier to a range less than said definite frequency of the modulating wave, transmitting said frequency-limited carrier from a sending station as an elemental length-modulated carrier wave through a transmission medium to a receiving station, translating its length-modulations to reproduce the signaling wave of definite frequency, and selectively employing said definite frequency of the reproduced signaling wave to render its signal.

54. The signaling method which consists in producing a carrier wave, modulating its amplitude by a signaling wave while independently modulating its wave-length by another wave, transmitting the carrier thus modulated, and translating it to convey the signal.

55. The signaling method which consists in transmitting a carrier wave from a sending station through a transmission medium to a receiving station in the form of an elemental carrier wave in said medium while modulating its fundamental frequency therein by a signaling wave within a modulation range constituting a limited percentage of the mean carrier frequency and thus occupying a correspondingly limited channel width in said transmission medium, translating the received elemental carrier into a secondary carrier wave having frequency modulations derived from said frequency modulations of the elemental carrier but measured by a greater percentage of the mean frequency of the secondary carrier, and translating the relatively greater frequency modulations of the secondary carrier to reproduce the signaling wave; whereby the modulation percentage is reduced in the transmission medium to economize channel space but increased in the demodulation process to facilitate demodulation.

56. The method which consists in transmitting a carrier wave from a sending station through a transmission medium to a receiving station in the form of an elemental carrier wave in said transmission medium while modulating its fundamental wave-length therein by a signaling wave, causing the received elemental carrier to interact with supplemental waves at the receiving station, deriving from said interaction a secondary carrier wave having a mean frequency different from the mean frequency of the received elemental carrier wave but having corresponding wave-length modulations, and deriving the signaling wave from said length-modulations of the secondary carrier.

57. The method which consists in transmitting a carrier wave from a sending station through a transmission medium to a receiving station in the form of an elemental carrier wave in said transmission medium while modulating its fundamental wave-length therein by a signaling wave, translating the received elemental carrier into a secondary carrier having corresponding length-modulations but different mean frequency, and deriving the signaling wave from said length-modulations of the secondary carrier.

58. The signal receiving method which consists in intercepting a wave radiated through the air as an elemental carrier wave whose fundamental wave length is modulated, causing said intercepted elemental carrier wave to coact with supplemental waves whose frequency equals the mean frequency of said carrier, and deriving a signal from the effect of the length-modulations of the elemental carrier in said coaction.

59. The signal receiving method which consists in intercepting a wave radiated through the air as an elemental carrier wave having its fundamental wave-length modulated by a signaling wave, causing said intercepted elemental carrier wave to coact with supplemental waves, deriving from said coaction a secondary carrier wave having length-modulations corresponding with the length-modulations of the intercepted carrier but having a different mean frequency, and deriving from the length-modulations of the secondary carrier a reproduction of the signaling wave carried on the length-modulations of the intercepted elemental carrier.

60. The signal receiving method which consists in intercepting a wave radiated through the air as an elemental carrier wave having its fundamental wave-length modulated by a signaling wave, deriving from said intercepted elemental carrier a secondary carrier wave having corresponding length-modulations but different mean frequency, and deriving from the length-modulations of said secondary carrier wave a reproduction of the signaling wave impressed on the length-modulations of the intercepted elemental carrier.

61. The signal receiving method which consists in intercepting a wave radiated through the air as an elemental carrier wave having its fundamental wave-length modulated by a signaling wave, causing said intercepted elemental carrier to coact with supplemental waves of different frequency, deriving from said coaction a secondary carrier wave having length-modulations corresponding with the intercepted elemental carrier but having a different mean frequency, and deriving from the length-modulations of the secondary carrier a reproduction of the signaling wave impressed on the length-modulations of the intercepted elemental carrier.

62. The signal receiving method which consists in intercepting a wave radiated through the air as an elemental carrier wave whose fundamental frequency is modulated by a signaling wave within limits constituting a given limited percentage of the mean carrier frequency, translating said intercepted elemental carrier into a secondary carrier wave having frequency modulations derived from the frequency modulations of the intercepted carrier but constituting a greater percentage of the mean frequency of the secondary carrier, and deriving the signaling wave from said relatively large frequency modulations of the secondary carrier, whereby a signal confined to a relatively small modulation percentage in the air is expanded to a relatively large modulation percentage in the receiving circuits to facilitate demodulation.

63. The signal receiving method which consists in intercepting a wave radiated through the air as an elemental carrier wave whose fundamental frequency is modulated by a signaling wave, causing said intercepted wave to coact with supplemental waves of different frequency, deriving from said coaction a secondary carrier wave of the differential frequency lower than the mean frequency of the intercepted wave but having corresponding frequency modulations, and deriving from said secondary carrier the signaling wave impressed on the frequency modulations of the elemental carrier wave in the air.

64. The signaling method which consists in producing a carrier wave, modulating its wave-length by a signaling wave while limiting its resulting frequency variation to a range or wave channel less than the modulating frequency, radiating it as an elemental carrier wave within said limited wave channel through the air from a sending station to a receiving station, and deriving the signaling wave from the length-modulations of the received elemental carrier.

65. The method of demodulating a modulated wave-component superposed on a fundamental carrier-wave, which consists in conveying said modulated component to demodulating means by one course, selectively amplifying the fundamental carrier wave while conveying it to the same demodulating means by another course, and deriving a demodulation wave from coaction of said modulated component and fundamental wave in said demodulating means while differentially applying the modulated component therein to produce nil demodulation effect when acting alone without the fundamental wave in said demodulator.

66. The wave translating method which consists in causing a modulated carrier wave to coact with a supplemental wave, deriving therefrom a secondary carrier wave including a fundamental carrier wave and a modulated wave-component superposed thereon, conveying said modulated component to demodulating means by one course, selectively amplifying said fundamental carrier wave while conveying it to the same demodulating means by another course, and deriving a demodulation wave from coaction of said modulated component and fundamental wave in said demodulating means while differentially applying the modulated component therein to produce nil demodulation effect when acting alone without the fundamental wave in said demodulator.

67. The method of receiving a radiated carrier wave having strength fluctuations, which consists in intercepting the carrier wave in the air, repeating the intercepted carrier wave and its carrier frequency through one or more wave-repeating steps while substantially suppressing its strength fluctuations in the course of such repetition, and employing the resulting wave of substantially constant strength to derive a demodulated signaling wave from the intercepted carrier wave.

68. A receiver for radiated carrier waves having strength fluctuations, comprising means for intercepting a carrier wave radiated through the air, wave repeating apparatus adapted to repeat said intercepted wave and its carrier frequency in one or more successive repetitions and to substantially suppress its strength fluctuations in the course of such repetition whereby to deliver an output wave of substantially constant strength, and means controlled by said repeater output wave for demodulating the intercepted carrier wave.

69. The signaling method which consists in radiating an elemental carrier wave while modulating its fundamental wave length by a signal, under conditions entailing amplitude fluctuations of said wave, deriving from said radiated fluctuating elemental wave in the air a wave of substantially constant strength at the receiving station and thereby eliminating from said derived wave the effects of strength fluctuations in the received elemental wave, and employing said wave of substantially constant strength to derive a demodulated signal wave from said modulations of the fundamental wave length of the elemental carrier wave in the air.

70. A receiver for a radiated elemental carrier wave whose fundamental wave length is modulated by a signal and whose amplitude fluctuates, comprising means for intercepting said elemental carrier wave in the air, means for deriving therefrom a wave of substantially constant strength in a local circuit, and demodulating means controlled by said derived wave in the local circuit for demodulating said modulations of the fundamental wave length of the intercepted elemental carrier wave in a manner to retain the effect of said length modulations.

71. The signaling method which consists in continuously transmitting a carrier wave while modulating its wave length by a signaling wave, continuously receiving the carrier wave, and translating its wave-length modulations to render the signal while substantially nullifying effects of disturbing amplitude fluctuations occurring in the carrier wave.

72. The signal receiving method which consists in continuously intercepting a continuously radiated carrier wave whose wave length is modulated by a signaling wave and whose amplitude fluctuates, and demodulating its wave-length modulations to reproduce the signaling wave while substantially eliminating the effect of its amplitude fluctuations from the demodulated signaling wave thus reproduced.

73. Apparatus for receiving from a transmitting medium a transmitted carrier wave whose wave length is modulated by a signal and whose amplitude fluctuates, comprising an initial receiving circuit arranged to derive said wave from the transmitting medium, and an organization of circuits controlled by said initial circuit and arranged to substantially nullify effects of amplitude fluctuations in the received carrier wave and translate its wave-length modulations to convey the signal.

74. The method of demodulating a phase-modulated carrier wave, which consists in superposing it on a supplemental wave of the same mean frequency, producing therefrom a resultant composite wave approximately in phase quadrature with the mean phase of said carrier wave component, whereby to translate the phase modulations of said carrier component into amplitude modulations of said composite wave, and translating said amplitude modulations to render the demodulation current.

75. The method of demodulating a phase-modulated carrier wave having amplitude fluctuations, which consists in superposing it on a supplemental wave of the same mean frequency to produce a resultant composite wave approximately in phase quadrature with the mean phase of said carrier wave component, whereby the phase modulations of said carrier component will produce amplitude modulations of said composite wave while the amplitude modulations of said carrier component will not prohibitively vary the amplitude of said composite wave, and translating said amplitude modulations of the composite wave to render the demodulated signaling wave.

76. The method which consists in producing a sub-carrier wave and a super-carrier wave, modulating the sub-carrier wave by a signal, modulating the wave-length of the super-carrier wave by another signal and also by said modulated sub-carrier, transmitting the resulting modulated super-carrier, and translating its wave-length modulations to convey the said signals.

77. The method which consists in receiving a carrier wave subjected to a signaling modulation of its wave-length and a disturbing modulation of its amplitude, utilizing the inherent difference between said types of modulation to separate the signaling effects of said wave-length modulation from the disturbing effects of said amplitude modulation, and deriving a signal from said separated effects of the wave-length modulation.

78. Carrier wave translating apparatus comprising wave-translating means inherently unresponsive to disturbing amplitude modulations of the received carrier wave but inherently responsive to its length-modulations to render a demodulated signaling wave, and means for utilizing the demodulated signaling wave thus rendered.

79. The method which consists in receiving a length-modulated carrier wave (A), deriving therefrom a second wave (B), employing said waves (AB) in a wave coordination adapted to demodulate the signal, and deriving a demodulated signaling wave (C) from the length-modulations of the carrier wave (A) in said coordination while suppressing the effects of length-modulations of said second wave (B) in said coordination.

80. The method which consists in receiving a length-modulated carrier wave (A), deriving therefrom a supplemental wave (B)

of the same frequency while suppressing length-modulations in the course of said derivation, causing said carrier and supplemental waves (AB) to coact, and deriving a demodulated signaling wave (C) from the length-modulations of the carrier wave (A) in said coaction.

81. The method which consists in producing an electrical carrier wave and an electrical signaling wave, employing said electrical signaling wave to modulate the phase of said electrical carrier wave within limits of 180 degrees, transmitting said modulated carrier from a sending station as an elemental electric carrier wave through a transmitting medium to a receiving station and thus conveying the signal between stations by said limited phase-modulations of the fundamental carrier frequency in said transmitting medium, and deriving from said limited phase modulation of the received elemental carrier a reproduction of the electrical signaling wave.

82. The signaling method which consists in producing an electrical carrier wave and an electrical signaling wave, employing said electrical signaling wave to modulate the frequency of said electrical carrier wave while limiting the resulting frequency variations to a range or wave channel less than the modulating frequency, radiating said modulated wave from a transmitting station as an elemental electric carrier wave within said limited wave channel through the air to a receiving station, and deriving the electrical signaling wave from said limited frequency modulations of the received elemental carrier.

83. The signal transmitting method which consists in producing a signaling wave, controlling its strength and wave-length by different signals, and impressing it upon a transmitting medium.

84. The method of transmitting carrier-wave signals which consists in producing a carrier-wave, modulating its amplitude and wave-length by separate signaling waves, and impressing the waves thus doubly modulated upon a transmitting medium.

85. The method of carrier-wave signaling which consists in producing a master wave, deriving therefrom a carrier-wave at a transmitting station, modulating the wave-length of said carrier by a signal while transmitting it as an elemental carrier-wave through a transmitting medium to a receiving station, deriving from the same master wave a supplemental wave at said receiving station, causing the received carrier-wave and the supplemental wave to coact, and deriving a signal from the effect of the length-modulations of the received elemental carrier in said coaction.

86. The method of carrier-wave signaling which consists in producing a master voltage wave, deriving therefrom a carrier-current wave at a transmitting station, modulating the phase of said carrier-current by a signal while transmitting it as an elemental carrier-wave through a transmitting medium to a receiving station, deriving from the same master voltage wave a supplemental wave at said receiving station synchronous with the mean phase of the received elemental carrier-wave, causing said supplemental wave and received elemental carrier to coact, and deriving a signal from the effect of the phase-modulations of the received elemental carrier in said coaction.

87. The method of receiving a carrier signal which consists in deriving a length-modulated carrier wave (A) from a transmission medium, producing a supplemental wave (B) of different frequency, beating said waves (AB) together to produce a beat wave (C) of the differential frequency, utilizing said beat wave (C) to combine its mean frequency with the frequency of one of said waves (AB) while suppressing the effects of length-modulation of said beat wave (C), thereby producing a resultant wave (D) having the same mean frequency as the wave (A or B) omitted from said frequency combination, and then causing said omitted wave (A or B) to coact with said resultant wave (B), and finally deriving a demodulated signaling effect from the last said wave coaction.

88. The method of receiving a carrier signal which consists in deriving a strength-modulated carrier wave (A) from a transmission medium, producing a supplemental wave (B) of different frequency, beating said waves (AB) together to produce a beat wave (C) of the differential frequency, utilizing said beat wave (C) to combine its frequency with the frequency of one of said waves (AB) and thereby producing a resultant wave (B) having the same frequency as the wave (A or B) omitted from said frequency combination, and then causing said omitted wave (A or B) to coact with said resultant wave (D), and finally deriving a demodulated signaling effect from the last said wave coaction.

In testimony whereof I have affixed my signature to this specification.

ALBERT V. T. DAY.